United States Patent
Wakabayashi et al.

(10) Patent No.: US 8,560,812 B2
(45) Date of Patent: Oct. 15, 2013

(54) DEVICE FOR EXECUTING AN INSTRUCTION USING A TARGET EXECUTION SPEED

(75) Inventors: Tetsuaki Wakabayashi, Toyota (JP); Koji Adachi, Kawasaki (JP); Kazuya Okamoto, Kariya (JP)

(73) Assignees: Toyota Jidosha Kabushiki Kaisha, Toyota-shi (JP); Renesas Electronics Corporation, Kawasaki (JP)

( * ) Notice: Subject to any disclaimer, the term of this patent is extended or adjusted under 35 U.S.C. 154(b) by 701 days.

(21) Appl. No.: 12/783,958

(22) Filed: May 20, 2010

(65) Prior Publication Data
US 2010/0312992 A1 Dec. 9, 2010

(30) Foreign Application Priority Data

Jun. 9, 2009 (JP) ................................. 2009-138327

(51) Int. Cl.
*G06F 9/30* (2006.01)
*G06F 9/40* (2006.01)
*G06F 15/00* (2006.01)

(52) U.S. Cl.
USPC ......................................................... 712/214

(58) Field of Classification Search
None
See application file for complete search history.

(56) References Cited

U.S. PATENT DOCUMENTS

| 5,600,805 A | 2/1997 | Fredericks et al. |
| 7,269,713 B2 * | 9/2007 | Anderson et al. ............. 712/214 |

FOREIGN PATENT DOCUMENTS

| JP | 6-35731 | 2/1994 |
| JP | 2000-47887 | 2/2000 |
| JP | 2004-234123 | 8/2004 |
| JP | 2007-328416 | 12/2007 |
| JP | 2008-47145 | 2/2008 |

OTHER PUBLICATIONS

Yamasaki; Prioritized SMT Architecture with IPC Control Method for Real-Time Processing; 2007; IEEE.*

* cited by examiner

*Primary Examiner* — Corey S Faherty
(74) *Attorney, Agent, or Firm* — Oblon, Spivak, McClelland, Maier & Neustadt, L.L.P.

(57) ABSTRACT

A multithread execution device includes: a program memory in which a plurality of programs are stored; an instruction issue unit that issues an instruction retrieved from the program memory; an instruction execution unit that executes the instruction; a target execution speed information memory that stores target execution speed information of the instruction; an execution speed monitor that monitors an execution speed of the instruction; a feedback control unit that commands the instruction issue unit to issue the instruction such that the execution speed of the instruction approximately corresponds to the target execution speed information.

11 Claims, 18 Drawing Sheets

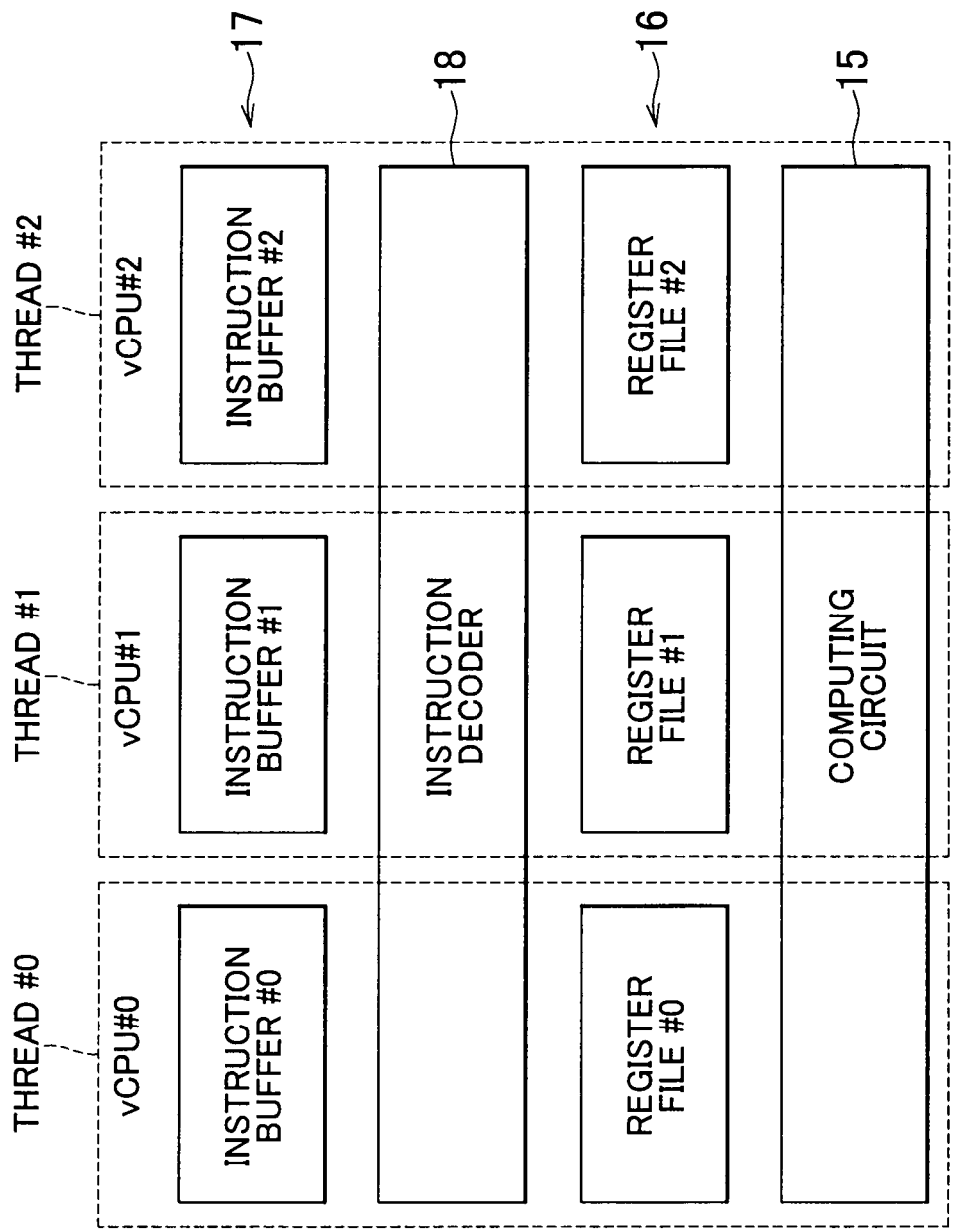

FIG. 6A
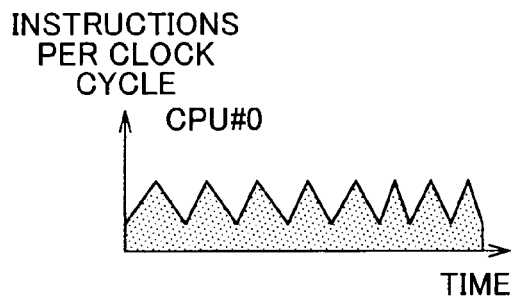
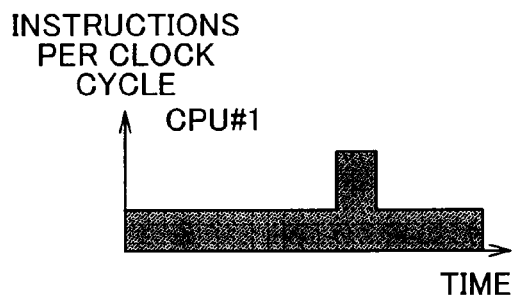
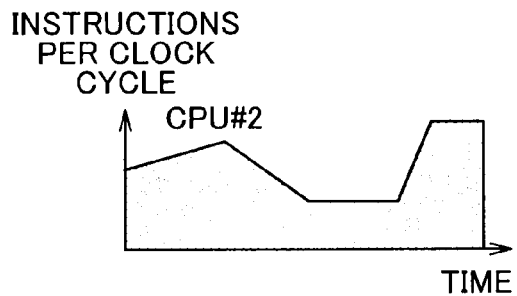
FIG. 6B
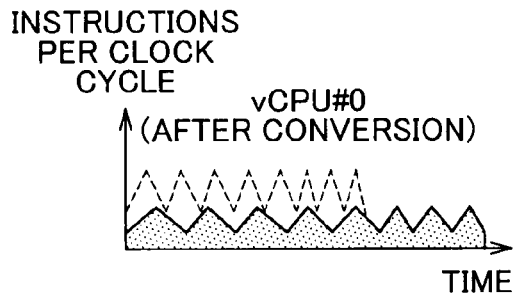
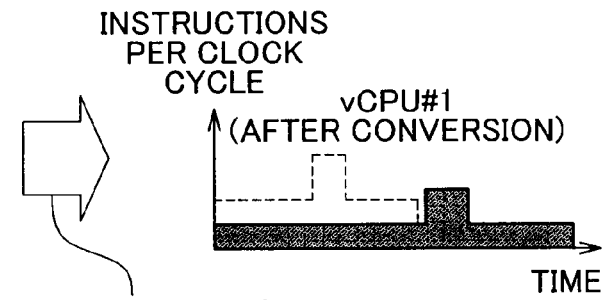
CONVERTED TO INSTRUCTIONS PER CLOCK CYCLE (IPC) IN vCPU
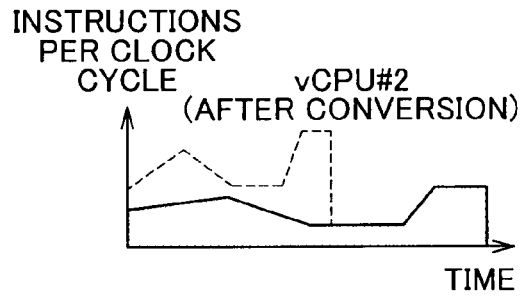
FIG. 6C
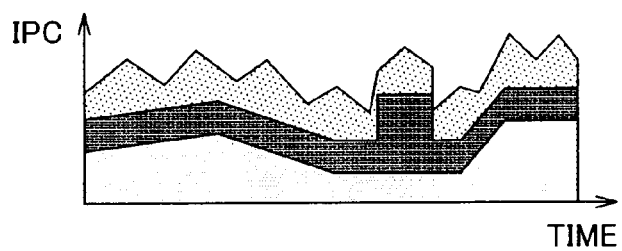

FIG. 8A

TARGET IPC = IPC OF CPU TO BE EMULATED (TARGET PROFILE VALUE) ÷ RATIO BETWEEN OPERATING FREQUENCY OF CPU TO BE EMULATED AND OPERATING FREQUENCY OF vCPU

FIG. 8B

TARGET NUMBER OF EXECUTE CYCLES = NUMBER OF EXECUTE CYCLES PER UNIT PROCESS OF CPU TO BE EMULATED (TARGET PROFILE VALUE) × RATIO BETWEEN OPERATING FREQUENCY OF CPU TO BE EMULATED AND OPERATING FREQUENCY OF vCPU

F I G. 9A

| IPC OF CPU TO BE EMULATED | TARGET IPC | SCHEDULE PARAMETER | MEASURED IPC | TIME |
|---|---|---|---|---|
| 0.8 | 0.4 | +3 | 0.27 | $T_0$ |
| | | +2 | 0.35 | |
| | | −1 | 0.45 | |
| | | ‥ | ‥ | |
| | | 0 | 0.41 | |
| 0.5 | 0.25 | −2 | 0.39 | $T_1$ |
| | | −1 | 0.30 | |
| | | +1 | 0.22 | |
| | | ‥ | ‥ | |
| | | 0 | 0.26 | |
| 0.7 | 0.35 | +2 | 0.27 | $T_2$ |
| | | +2 | 0.30 | |
| | | 0 | 0.35 | |
| | | ‥ | ‥ | |
| | | 0 | 0.34 | |

FIG. 9B

| NUMBER OF EXECUTE CYCLES PER UNIT PROCESS OF CPU TO BE EMULATED | TARGET NUMBER OF EXECUTE CYCLES | SCHEDULE PARAMETER | NUMBER OF EXECUTE CYCLES PER UNIT PROCESS (ACTUAL MEASURED VALUE) | TIME |
|---|---|---|---|---|
| 100 | 200 | +3 | 150 | $T_0$ |
|  |  | +2 | 170 |  |
|  |  | −1 | 220 |  |
|  |  | .. | .. |  |
|  |  | 0 | 205 |  |
| 80 | 160 | −2 | 240 | $T_1$ |
|  |  | −1 | 220 |  |
|  |  | +1 | 150 |  |
|  |  | .. | .. |  |
|  |  | 0 | 155 |  |
| 90 | 180 | +2 | 170 | $T_2$ |
|  |  | +2 | 170 |  |
|  |  | 0 | 178 |  |
|  |  | .. | .. |  |
|  |  | 0 | 180 |  |

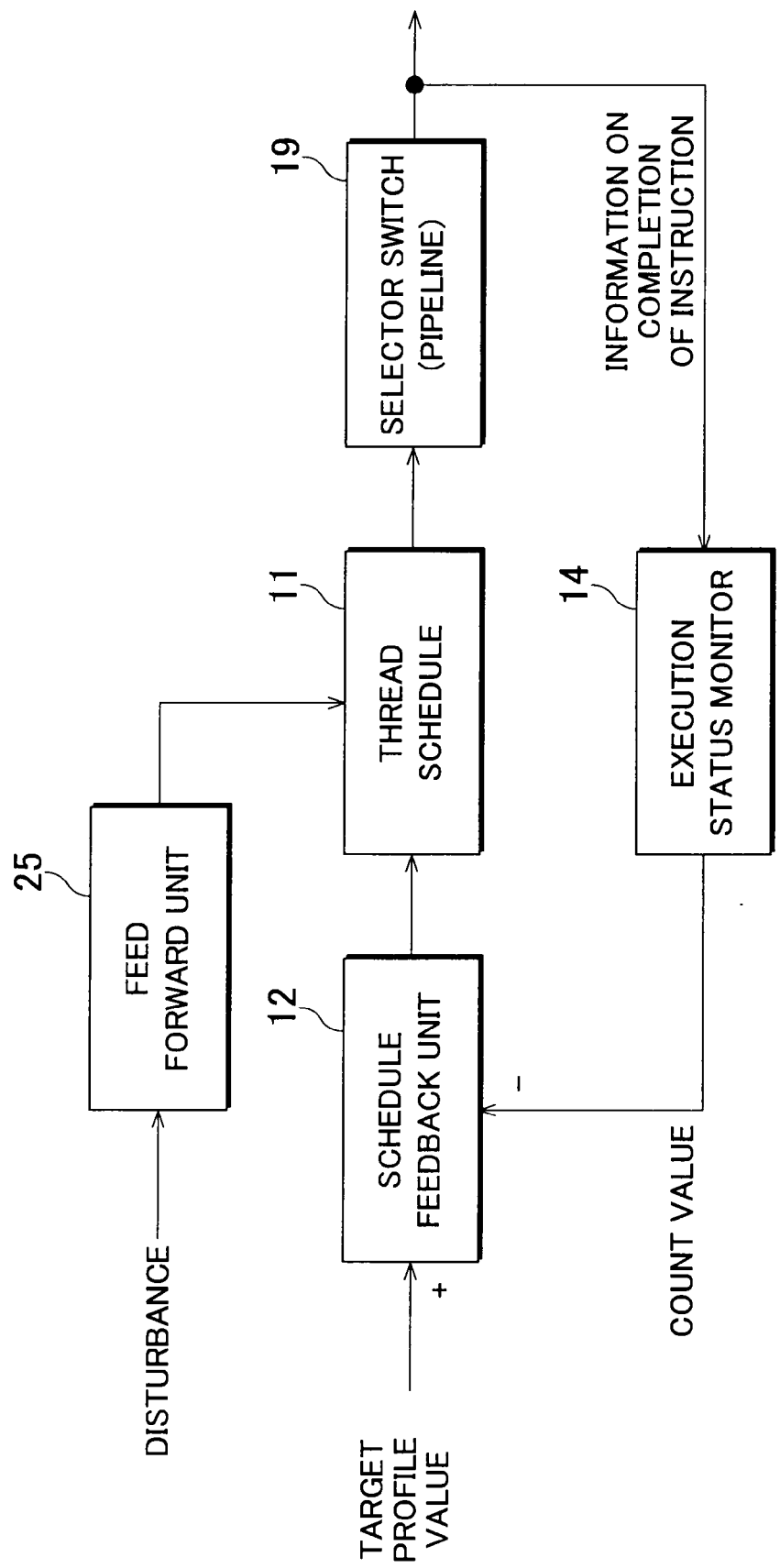
F I G . 16

DEVICE FOR EXECUTING AN INSTRUCTION USING A TARGET EXECUTION SPEED

INCORPORATION BY REFERENCE

The disclosure of Japanese Patent Application No. 2009-138327 filed on Jun. 9, 2009 including the specification, drawings and abstract is incorporated herein by reference in its entirety.

BACKGROUND OF THE INVENTION

1. Field of the Invention

The present invention relates to a multithread execution device that individually executes a plurality of programs and a method for executing multiple threads, and particularly, relates to a multithread execution device that adjusts the instruction issue rate for each program and a method for executing multiple threads.

2. Description of the Related Art

Various methods for efficiently executing a program are generally considered. Many of the approaches that improve execution efficiency attempt to shorten the time period in which a computing circuit of a CPU does not execute the program. For example, a technology to reduce branching or confirmation pending of the content of a process by a user operation (see Japanese Patent Application Publication No. 2007-328416 (JP-A-2007-328416) and Japanese Patent Application Publication No. 2000-47887 (JP-A-2000-47887), for example), a technology to reduce software overhead that is caused by an input/output (I/O) interrupt (see Japanese Patent Application Publication No. 6-35731 (JP-A-6-35731)), and a technology to reduce a hardware overhead such as context switching (Japanese Patent Application Publication No. 2004-234123 (JP-A-2004-234123) have been proposed.

JP-A-2007-328416 describes a heterogeneous multiprocessor that arranges a part of the program, which statically determines a processing order, in accordance with a characteristic of a processing unit (PU) upon compilation of the part of the program. In addition, JP-A-6-35731 describes a method for controlling an I/O subsystem call instruction in which hypervisor intervention is controlled by masking a subsystem call used to access shared resources. It is possible to suppress the overhead that is caused by the interrupt by controlling the hypervisor intervention. Furthermore, JP-A-2000-47887 describes a multithreaded processor that speculatively issues an instruction to a plurality of processors, and that includes a thread manager for controlling initiation of execution, termination, switching of the execution status, and data transfer between the threads in each processor. The multithreaded processor improves prediction accuracy of speculative execution by concurrently executing a plurality of program paths. Moreover, JP-A-2004-234123 describes a method for executing multiple threads that fixedly assigns a program counter and a register set to the thread and that switches between the standby thread and the executed thread, in a multithreaded processor that has a plurality of hardware threads. Because a time period that is required to prepare the thread is reduced, the processing speed is increased.

However, technologies as represented by those described in JP-A-2007-328416, JP-A-6-35731, JP-A-2000-47887, and JP-A-2004-234123 that simply improve the execution efficiency may affect a system that exhibits dependency on execution timing between two programs.

FIG. 1A shows a relationship between the execution timing of a program #0 and the execution timing of a program #1. The program #0 is executed by a CPU_A1, while the program #1 is executed by a CPU_B1. The CPU_A1 and the CPU_B1 are generally installed in different computers.

The program #0 executes a process "a", while the program #1 executes a process "b1" and a process "b2". The process "b2" is executed by using a processing result of the process "a". In FIG. 1A, because the execution timing of the program #0 is synchronized with the execution timing of the program #1, the CPU_B1 can execute process "b2" by using the processing result of the process "a".

FIG. 1B shows the execution timing of the program #0 and the execution timing of the program #1 when a CPU_B2, instead of the CPU_B1, executes the program #1. The CPU_B2 has higher instructions per clock cycle (IPC) or the smaller execution number of cycles per unit process than the CPU_B1, that is, the CPU_B2 has a fast execution speed. Because the CPU_B2 executes the program #1, the execution timing of the process "b1" is advanced. Meanwhile, when the process "b1" is completed, the CPU_A1 has not completed execution of the process "a". Thus, when the CPU_B2 executes the process "b2", the CPU_B2 cannot use the processing result of the process "a". Consequently, the CPU_B2 may then execute the process "b2" using data that is obtained before the process "a" is completed.

In recent years, a CPU that includes hardware multithreading technology and a multi-core CPU in which a plurality of cores are installed in a single CPU have become available. Thus, it is considered to port the program #0 and the program #1 that have been respectively executed by the CPU_A1 and CPU_B1 to a single CPU to execute the programs. Such technology may be used when a plurality of electronic control units (ECUs) that are connected to an on-vehicle LAN are integrated into a fewer number of ECUs.

However, the CPU that is installed in the integrated ECU has different architecture from the CPU that is installed in the pre-integrated ECU. Thus, the same problem as that in FIG. 1B occurs if the program #0 and the program #1 that exhibit dependency to each other are simply ported to the integrated ECU.

On possible solution to this problem is to adjust the instruction issue rate when the nonconforming programs #0 and #1 are ported to an integrated CPU.

FIG. 2A shows a relationship between the CPU_A1 and the CPU_B1 before integration and the integrated CPU. An operation clock of the CPU_A1 is 60 MHz, while an operation clock of the CPU_B1 is 180 MHz. For sake of simplicity, the IPC of the CPU_A1 is set equal to the IPC of the CPU_B1 (IPC=1). However, the IPC of the CPU_A1 may differ from the IPC of the CPU_B1. An operation clock of the integrated CPU is 180 MHz. Thus, the execution speed of the CPU_B1 is three times faster than the execution speed of the CPU_A1. A vCPU_A1 and a vCPU_B1 that are included in the integrated CPU are virtual CPUs.

In order to correspond the execution timing of the program #0 that is executed by the CPU_A1 to the execution timing of the program #1 that is executed by the CPU_B1, the instruction issue rate has to be changed in the integrated CPU in accordance with the original execution speeds before integration.

FIG. 2B shows a relationship between the instruction issue rate and the execution numbers. If the execution speed of the CPU_B1 is three times faster than the execution speed of the CPU_A1, the integrated CPU issues three instructions to the vCPU_B1 while issuing one instruction to the vCPU_A1. Accordingly, the execution timing of the program #0 that is executed by the CPU_A1 before integration and the execution timing of the program #1 that is executed by the CPU_B1 before integration can correspond to each other to a certain degree in the integrated CPU.

However, not only operating frequencies, but also an instruction set and the number of instructions executed per unit time such as the IPC vary between the integrated CPU, and the CPU_A1 and the CPU_B1. In addition, when the integrated CPU includes a pipeline with multiple steps or includes a plurality of pipelines, the number of instructions executed per unit time varies due to a hazard or a stall. Thus, even when the instruction issue rate is determined in consideration of the IPC, a desired instruction issue rate cannot be obtained.

Therefore, with mere control of the instruction issue rate, it is impossible to correspond the number of instructions executed per unit time in the vCPU_A1 to the number of instructions executed per unit time in the CPU_A1, and it is also impossible to correspond the number of instructions executed per unit time in the vCPU_B1 with the number of instructions executed per unit time in the CPU_B1. For example, even when the instruction issue rate is controlled, the execution number of the program #0 per unit time and the execution number of the program #1 per unit time fluctuate repeatedly. Eventually, the execution timing of the program #0 significantly varies from the execution timing of the program #1.

More specifically, when the plurality of programs #0 and #1 are integrated by using the multithreading technology or the multi-core in the related art, the execution timings of the plurality of programs #0 and #1 before integration cannot be guaranteed after integration.

SUMMARY OF THE INVENTION

The present invention provides a multithread execution device and a method of executing multiple threads that can dynamically optimize the number of instructions executed per unit time by a CPU.

A first aspect of the present invention is directed to the multithread execution device. This multithread execution device includes: a program memory in which a plurality of programs are stored; an instruction issue unit that issues an instruction of the program retrieved from the program memory; an instruction execution unit that executes the instruction; a target execution speed memory that stores target execution speed of the instruction; an execution speed monitor that monitors an execution speed of the instruction; and a feedback control unit that commands the instruction issue unit to issue the instruction such that the execution speed approximately equal to the target execution speed.

A second aspect of the present invention is directed to the method for executing multiple threads. This method for executing multiple threads includes: retrieving an instruction from a program memory that stores a plurality of programs; issuing the retrieved instruction of the program through an instruction issue unit; executing the instruction; monitoring an execution speed of the instruction; and commanding the instruction issue unit to issue the instruction such that the execution speed approximately equal to target execution speed retrieved from a target execution speed memory in which the target execution speed of the instruction is stored.

The present invention can provide the multithread execution device and the method for executing multiple threads that can dynamically optimize the number of instructions executed per unit time by a CPU.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 3A and 3B are schematic diagrams of a multithread execution device according to a first embodiment of the present invention;

FIG. 6A to 6C are views that schematically illustrate target profiles;

FIGS. 8A and 8B are views that respectively show computational procedures of the target IPC and the target number of execute cycles;

FIGS. 9A and 9B are views that respectively illustrate a schedule parameter that is generated from the target IPC and the number of instructions executed per unit time, and a schedule parameter that is generated from the target number of execute cycles and the number of execute cycles per unit process;

FIG. 16 is a schematic view of a thread scheduling control system.

DETAILED DESCRIPTION OF EMBODIMENTS

Figure 1A:
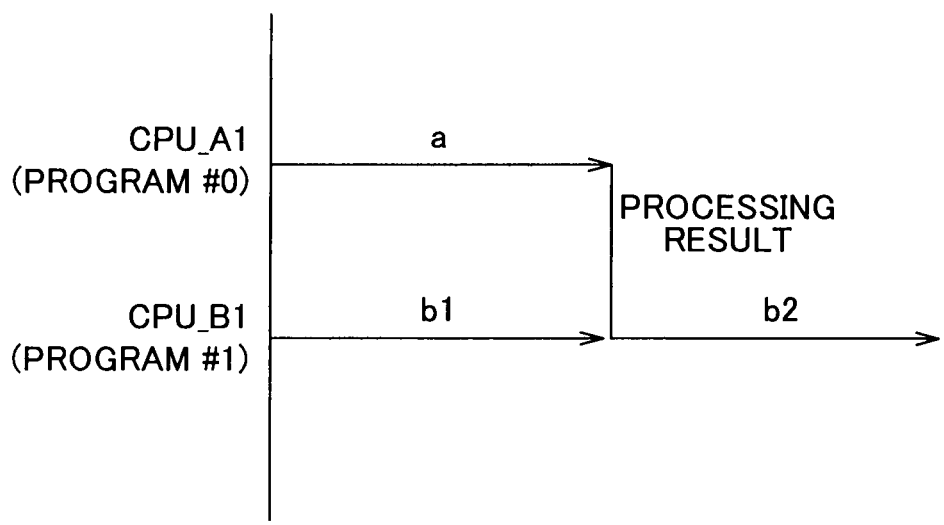
FIGS. 1A and 1B show a relationship between execution timing of a program #0 and execution timing of a program #1.
Figure 1B:
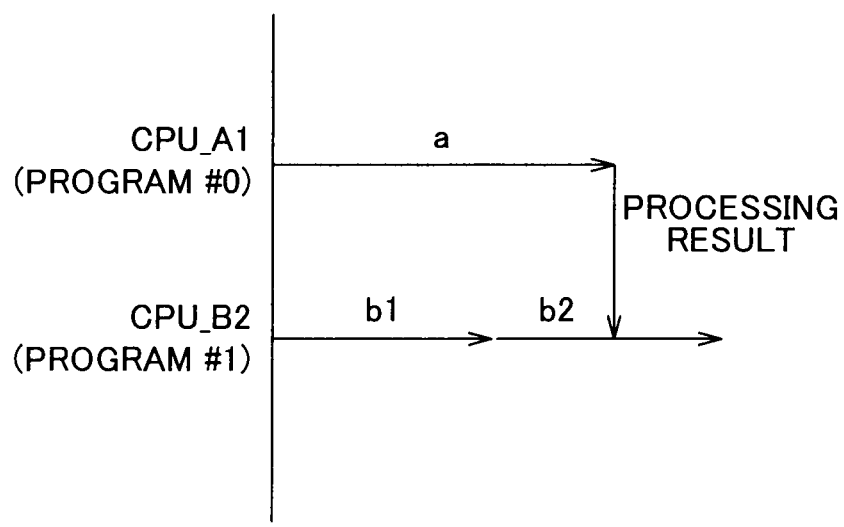
Figure 2A:
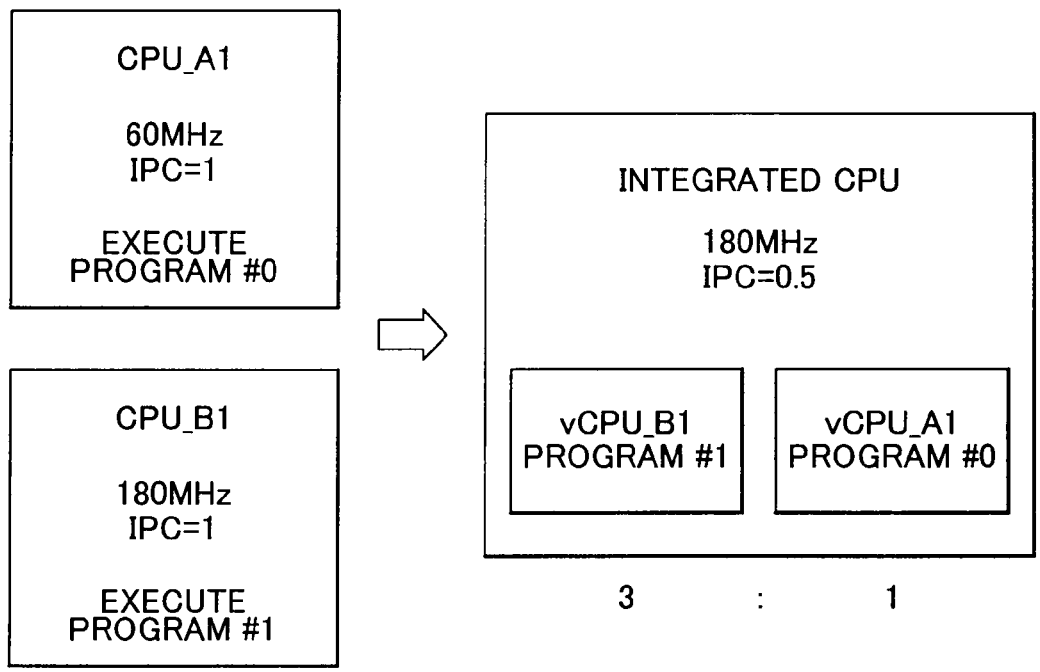
FIGS. 2A and 2B show a relationship between a CPU_A1 and a CPU_B1 before integration and when integrated in a single CPU.
Figure 2B:
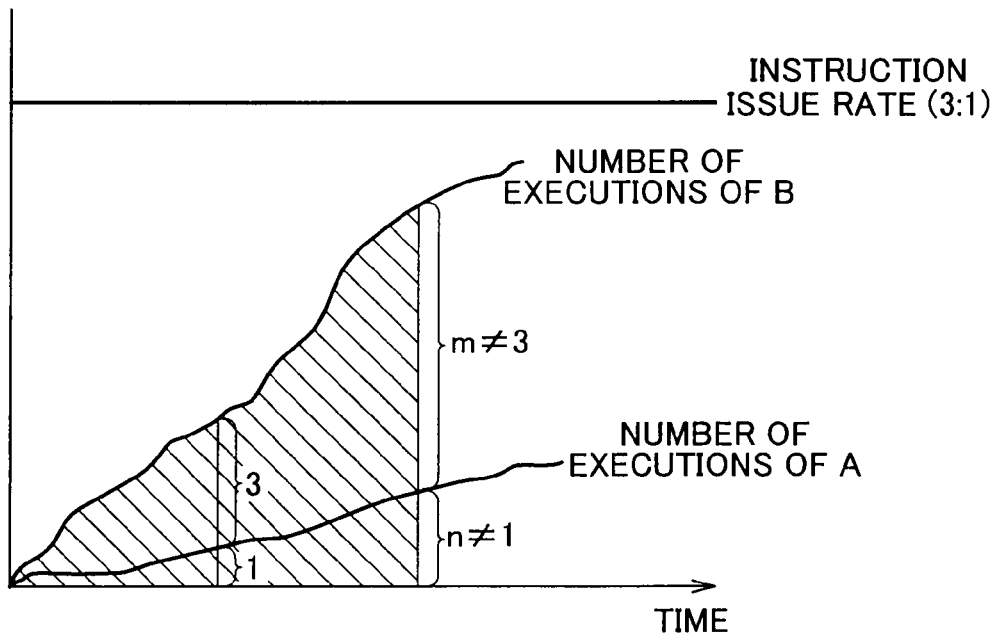
Figure 3A:
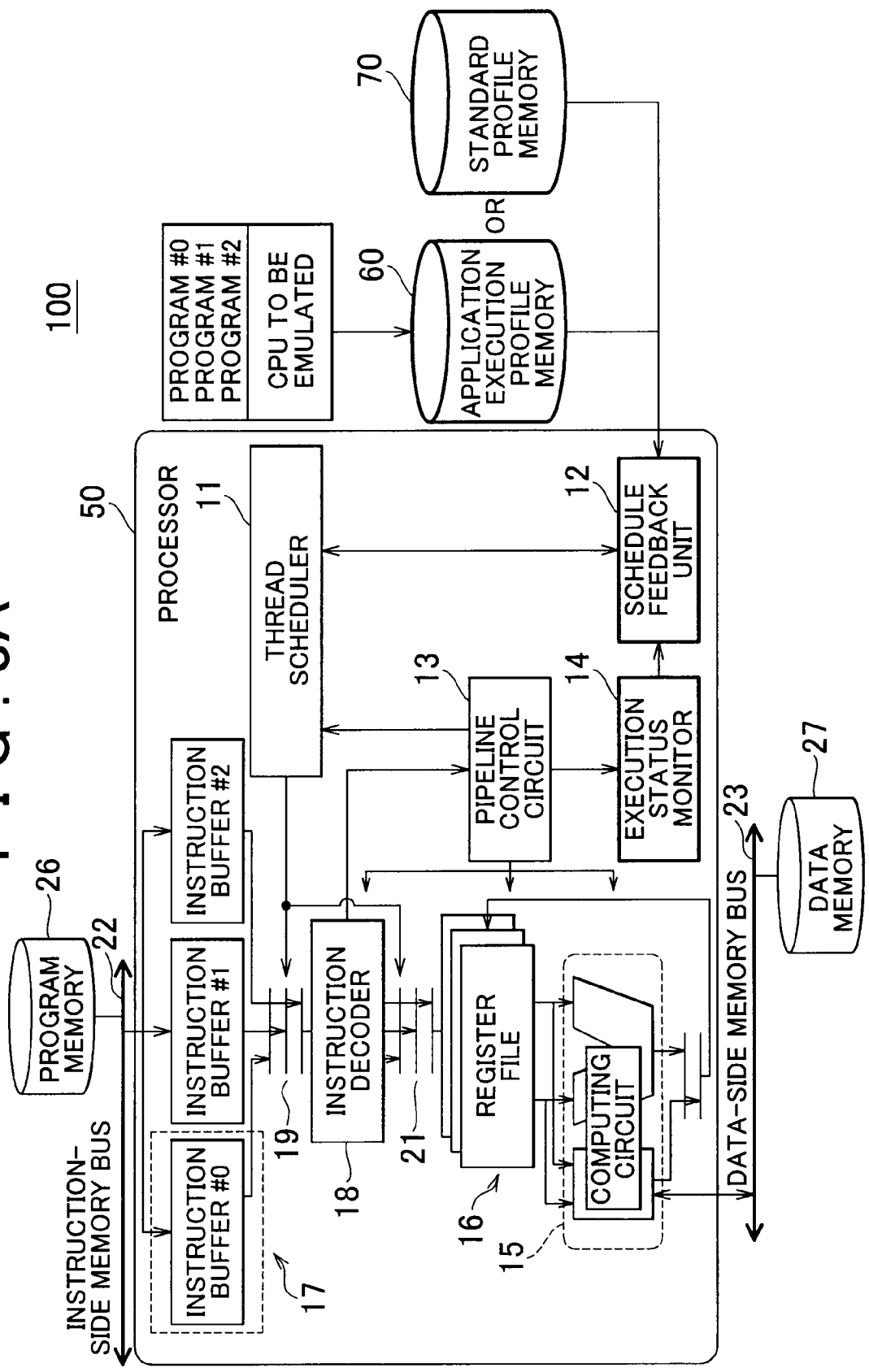

A first and a second embodiment of the present invention are described below with reference to the drawings. FIG. 3A is a schematic diagram of a multithread execution device 100 according to the first embodiment of the present invention. The outline of the procedures in which the multithread execution device 100 dynamically optimizes the execution number of a program will be described first. (1) An application execution profile or a standard profile (hereinafter referred to as a "target profile" unless these profiles are distinguished from each other) is provided.

The application execution profile, which will be described in detail later, is the number of instructions executed per unit time or the number of execute cycles per unit process of the program by a CPU before integration (hereinafter referred to as an emulated CPU). In other words, the application execution profile is information that indicates the execution speed of the emulated CPU. Meanwhile, the standard profile is the standard number of instructions executed per unit time or the standard number of execute cycles per unit process when the application execution profile cannot be obtained. (2) An execution status monitor 14 counts the number of instructions executed per unit time or the number of execute cycles per unit process for each program (for each hardware thread). (3) A schedule feedback unit 12 compares the target profile with the number of instructions executed per unit time or with the number of execute cycles per unit process, and provides a schedule parameter to a thread scheduler 11 for each program. (4) The thread scheduler 11 controls an instruction issue rate of each program in accordance with the schedule parameter. Accordingly, the thread scheduler 11 adjusts the instruction issue rate of each program so that the number of instructions executed per unit time or the number of execute cycles per unit process approximately corresponds to the target profile.

Accordingly, in the multithread execution device 100 of this embodiment, even if a plurality of CPUs are integrated into a single CPU, the number of instructions executed per unit time or the number of execute cycles per unit process of each program is approximately equal to the number of instructions executed per unit time or the number of execute cycles per unit process before integration. Therefore, there is no need to recode each program upon integration. In addition, execution timing between programs need not be considered. Particularly, as will be described later, the plurality of CPUs may be integrated into the single CPU of a different computer by using the number of execute cycles per unit process for feedback control.

As shown in FIG. 3A, the multithread execution device 100 includes: a processor 50; and an application execution profile memory 60 or a standard profile memory 70 that is connected to the processor 50. Either or both of the application execution profile memory 60 and the standard profile memory 70 may be provided. When both the application execution profile memory 60 and the standard profile memory 70 are provided, the schedule feedback unit 12 may select the type of memory from which the target profile is retrieved. For example, if the application execution profile may be obtained for one program but not for another program in the emulated CPU, the schedule feedback unit 12 changes the target profile to be retrieved in accordance with the programs. The application execution profile memory 60 or the standard profile memory 70 includes a nonvolatile memory such as a flash memory. The application execution profile memory 60 and the standard profile memory 70 need not be provided individually, but may be installed in the processor 50.

The processor 50 has an execution environment of hardware multithreading. Hardware multithreading is a structure in which a plurality of instruction buffers 17 and a plurality of register files 16 (system registers, etc.) are included, and in which the instruction buffers 17 and the register files 16 are appropriately switched to execute the instruction. Although a function or the like of a program or a part of the program is called a thread as an executable unit of processing, the thread in this embodiment is an instruction supply unit of a hardware type. In FIG. 3A, because the multithread execution device 100 includes the three instruction buffers 17 and the three register files 16, the multithread execution device 100 also has three threads #0 to #2. FIG. 3B is a view that shows relationships between the threads #0 to #2 and hardware resources.

Because the multithread execution device 100 alternates between the threads each clock cycle to execute different programs, the physically existing processor 50 allows the multithread execution device 100 to operate as though it has a plurality of virtual CPUs. A thread #0 includes an instruction buffer #0, an instruction decoder 18, a register file #0, and a computing circuit 15. A thread #1 includes an instruction buffer #1, the instruction decoder 18, a register file #1, and the computing circuit 15. A thread #2 includes the instruction buffer #2, the instruction decoder 18, a register file #2, and the computing circuit 15. Accordingly, the threads #0 to #2 together with other surrounding circuits are respectively called virtual CPUs (vCPUs) #0 to #2. Because the plurality of vCPUs #0 to #2 are provided, programs #0 to #2 that are independently executed in the CPUs before integration may also be independently executed in the multithread execution device 100.

Although this embodiment will be described with its focus on hardware multithreading, the feedback control of the number of instructions executed may be applied in a multi-core CPU. In such a case, each core in the multi-core CPU may execute the feedback control, or another CPU core may be provided to schedule the thread that is executed by each core. Alternatively, a scheduler (an operation system (OS), for example) that is shared by the cores may execute the feedback control.

The instruction buffers #0 to #2 are connected to an instruction-side memory bus 22. The instruction-side memory bus 22 is connected to a program memory 26 that includes a nonvolatile memory medium (EEPROM, for example) that stores the programs #0 to #2. The thread scheduler 11 outputs the address of a program counter, which is not shown, provided for each of the instruction buffers #0 to #2, to the instruction-side memory bus 22, and individually transmits instructions of the programs #0 to #2 to the instruction buffers #0 to #2, respectively. The instruction buffers #0 to #2 are connected to a selector switch 19. The selector switch 19 connects only one of the instruction buffers 17 to an instruction decoder 18 at a time.

The thread scheduler 11 selects one of the instruction buffers #0 to #2 that issues an instruction. As will be described later, the thread scheduler 11 selects the thread that issues an instruction based on the schedule parameter obtained from the schedule feedback unit 12. Accordingly, it is possible to independently control instructions per clock cycle (IPC) for each program, and thereby control the instruction issue rate (that is, to dynamically determine the instruction issue rate). The instruction issue rate for each of the threads #0 to #2 may statically be determined.

The thread scheduler 11 is connected to the selector switch 19 and a selector switch 21. The thread scheduler 11 switches the connection of the selector switch 19 to select one of the instruction buffers #0 to #2, and the selected instruction buffer is connected to the instruction decoder 18. The instruction from the selected thread of the threads #0 to #2 that is selected by the thread scheduler 11 is retrieved from the corresponding one of the instruction buffer #0 to #2 and transmitted to the instruction decoder 18. In addition, the thread scheduler 11 may disconnect all of the instruction buffers #0 to #2 from the instruction decoder 18. In a similar fashion, the thread scheduler 11 switches the connection of the selector switch 21 to one of the register files #0 to #2 from another, and the selected register file is used by the instruction decoder 18 and the computing circuit 15.

The instruction decoder 18 decodes the instruction, and transmits the decoded instruction to the selected register file of the register files #0 to #2 and to a pipeline control circuit 13.

The register files #0 to #2 are a group of registers that temporarily store computed results generated by the computing circuit 15 as well as data retrieved from data memory 27 connected to a data-side memory bus 23. The decoded instructions are a type of computation, one or more source operands, and a storage location of the computation result, and the like. Because the source operand is supplied to the register file 16, the source operand specifies the register that is used by the computing circuit 15 for computation.

When the instruction decoder 18 transmits the type of computation to the pipeline control circuit 13, the pipeline control circuit 13 specifies the type of computation that the computing circuit 15 executes. According to the type of computation, the computing circuit 15 computes data that is stored in the register file 16. Various types of computation such as storing, loading, addition, multiplication, division, branching, and the like are executed by the computing circuit 15. When either a storing or loading instruction is provided, the computing circuit 15 specifies a computed address to fetch data from the data-side memory bus 23. Then, the computing circuit 15 writes back the computation result such as addition or the loaded data to a register of the register file 16 that is specified by the storage location of the computation result.

The pipeline control circuit 13 controls each stage of the pipeline control (instruction fetch, instruction decoding, instruction execution, operand fetch, write-back, and the like) based on an operation clock. In addition, a hazard (a factor that prevents completion of processing within a set time period in each stage) is unavoidable in pipeline processing. Thus, the pipeline control circuit 13 refers to the type of computation, the source operand, and the like to generate a stall in the pipeline, to insert a NOP instruction, to flush the content of each stage that becomes redundant as a result of branching. For example, when a hazard such as input/output (I/O) pending occurs in the thread (the thread #0, for example), the pipeline control circuit 13 commands the thread scheduler 11 to terminate the thread #0 and to execute another thread (the thread #1, for example).

The pipeline control circuit 13 is connected to the execution status monitor 14. The execution status monitor 14 is connected to the schedule feedback unit 12. The execution status monitor 14 counts the number of instructions executed per unit time or the number of execute cycles per unit process for each thread (hereinafter referred to as a "count value" unless these numbers are distinguished from each other). The schedule feedback unit 12 compares the count value with the target profile for each of the thread #0 to #2 to generate the schedule parameter, and outputs the schedule parameter to the thread scheduler 11. These tasks performed by the execution status monitor 14 and the schedule feedback unit 12 will now be described in detail.

Figure 4:
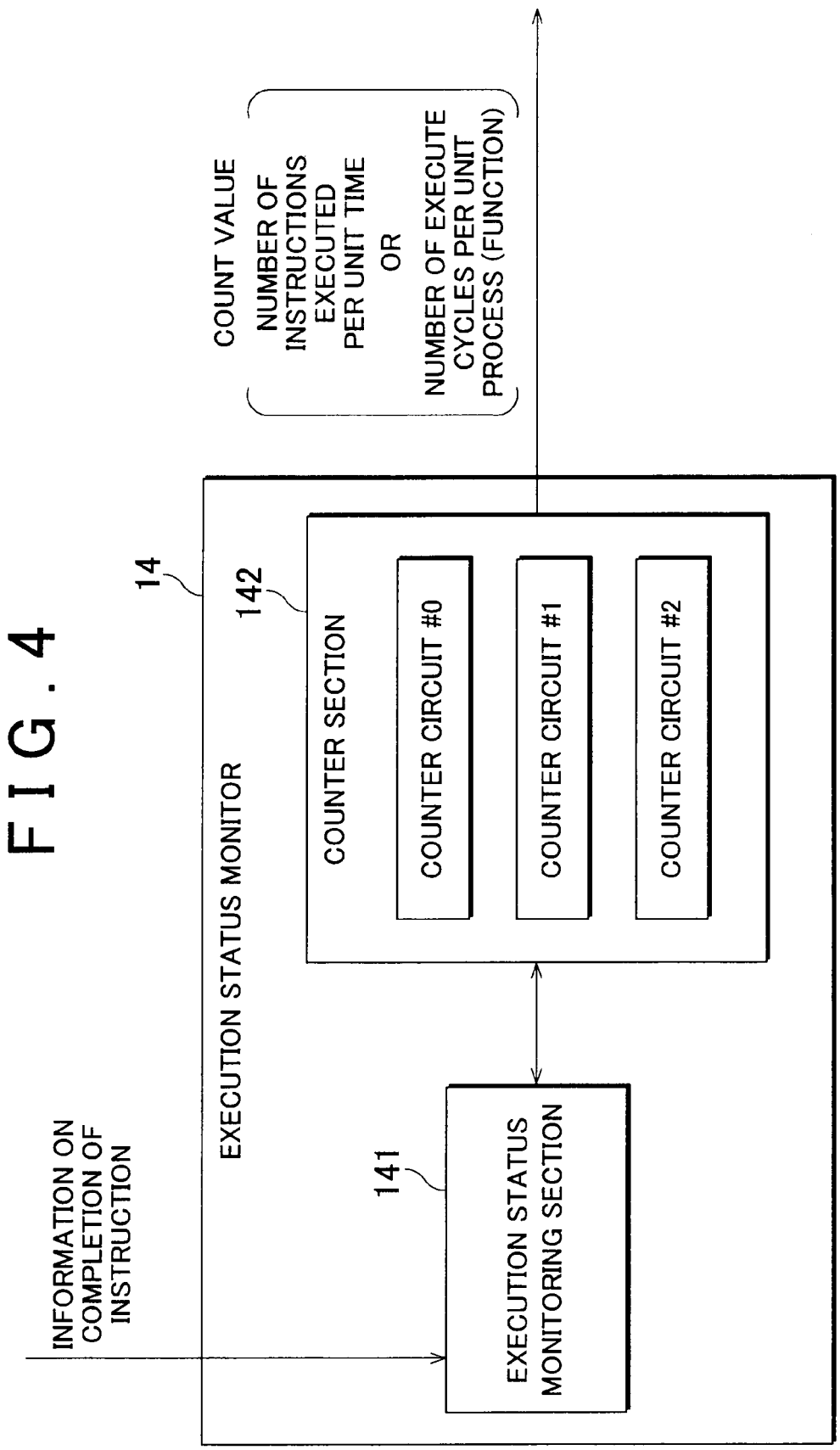
FIG. 4 is a schematic diagram of an execution status monitor that is illustrated in FIG. 3A.

FIG. 4 shows schematic configuration of the execution status monitor 14. The execution status monitor 14 includes an execution status monitoring section 141 and a counter section 142. The number of instructions executed per unit time and the number of execute cycles per unit process each indicates the execution speed of the instruction in a broad sense. In order for the schedule feedback unit 12 to generate the schedule parameter, the number of instructions executed per unit time is used when the instruction set architectures (ISAs) of the emulated CPUs are the same as the ISAs of the vCPU #0 to #2, or the number of execute cycles per unit process is used, and when the ISAs of the emulated CPUs respectively differ from the ISAs of the vCPU #0 to #2.

The ISA is a set of instruction formats (binary opcodes) that are implemented in the emulated CPU. Thus, if the ISAs of the emulated CPUs are respectively the same as the ISAs of the vCPU #0 to #2, the number of instructions executed until completion of processing is the same between the emulated CPU and the corresponding the vCPU. Meanwhile, even if the ISAs of the emulated CPUs are the same as the ISAs of the vCPU #0 to #2, the number of execute cycles per unit process varies between the particular emulated CPU and the corresponding vCPU due to the pipeline structure and the like of the emulated CPU. However, because the number of instructions executed for the completion of processing is the same, it is possible to match the progress by the number of instructions executed.

However, if the ISAs of the emulated CPUs differ from the ISAs of the vCPUs #0 to #2, the number of instructions executed until the completion of processing by the emulated CPU differs from the number of instructions executed by the corresponding vCPU. Thus, the number of instructions executed per unit time does not correspond to the execution progress of the instruction on a source code. Thus, if the ISAs of emulated CPUs differ from the ISAs of the vCPUs #0 to #2, the number of execute cycles per unit process is used to generate the schedule parameter such that the actual execution progress corresponds to the execution progress on the source code.

First, the counting of the number of instructions executed per unit time will be described. The pipeline control circuit 13 transmits data to the circuit and the register, while transferring an instruction to each stage of the pipeline processing. Thus, the pipeline control circuit 13 knows when the instruction is completed (upon write-back to the register file 16, for example). In addition, the thread for which the instruction has been executed may be determined from the statuses of the thread scheduler 11 and the selector switch 19. The pipeline control circuit 13 outputs information on completion of an instruction to the execution status monitor 14 each time the single instruction is completed. More specifically, the number of signal lines connecting the pipeline control circuit 13 to the execution status monitor 14 corresponds to the number of the threads. The pipeline control circuit 13 outputs a High signal only to the signal line that corresponds to the thread that has been executed.

If the execution status monitoring section 141 obtains the information on completion of the instruction, the execution status monitoring section 141 commands the counter section 142 to count up. More specifically, the execution status monitoring section 141 outputs the High signal to one of counter circuits #0 to #2 that are provided for each thread. Accordingly, the counter section 142 can count the number of instructions executed for each thread. The higher number of instructions executed per unit time indicates the faster execution speed.

Then, the counter section 142 outputs the count value to the schedule feedback unit 12 each unit time. The execution status monitoring section 141 resets the counter section 142 (returns the count value to zero) immediately after the counter section 142 outputs the count value to the schedule feedback unit 12. Thus, the counter section 142 outputs the number of instructions executed per unit time to the schedule feedback unit 12. The unit time may be, for example, 10 to 1,000 times longer than the operation clock cycle. If the unit time is too short, the count value fluctuates significantly. On the other hand, if the unit time is too long, it is inappropriate for the feedback control. Thus, the number of execute cycles per unit process that is not excessively short as the unit time is set in the execution status monitor 14.

Next, the counting of the number of execute cycles per unit process will be described. A unit process is a function that puts together a series of processes, for example. In the C language, "function name~{process group}" is a single unit process. When the processor 50 executes a compiled object code, the object code is added with specified codes for initialization and post-processing of a stack pointer at the beginning and the end of the function, respectively. Upon detection of the codes that indicate the beginning and the end of the function, the pipeline control circuit 13 outputs the High signal to the execution status monitor 14.

If the High signal is received at the beginning of the function, the execution status monitoring section 141 requests the counter section 142 to start counting the operation clock. Then, if the High signal is received at the end of the function, the execution status monitoring section 141 commands the counter section 142 to output the count value to the schedule feedback unit 12. The execution monitoring section 141 resets the counter section 142 (returns the count value to zero) each time the execution monitoring section 141 receives the High signal. Accordingly, the counter section 142 counts and outputs the number of execute cycles required for completion of the function (the number of execute cycles per unit process) to complete execution of the process. A higher number of the execute cycles per unit process indicates a slower execution speed.

It is possible to port the plurality of programs #0 to #2 to a different computer that has a CPU with a different ISA by using the number of execute cycles per unit process for the feedback control.

Figure 5:
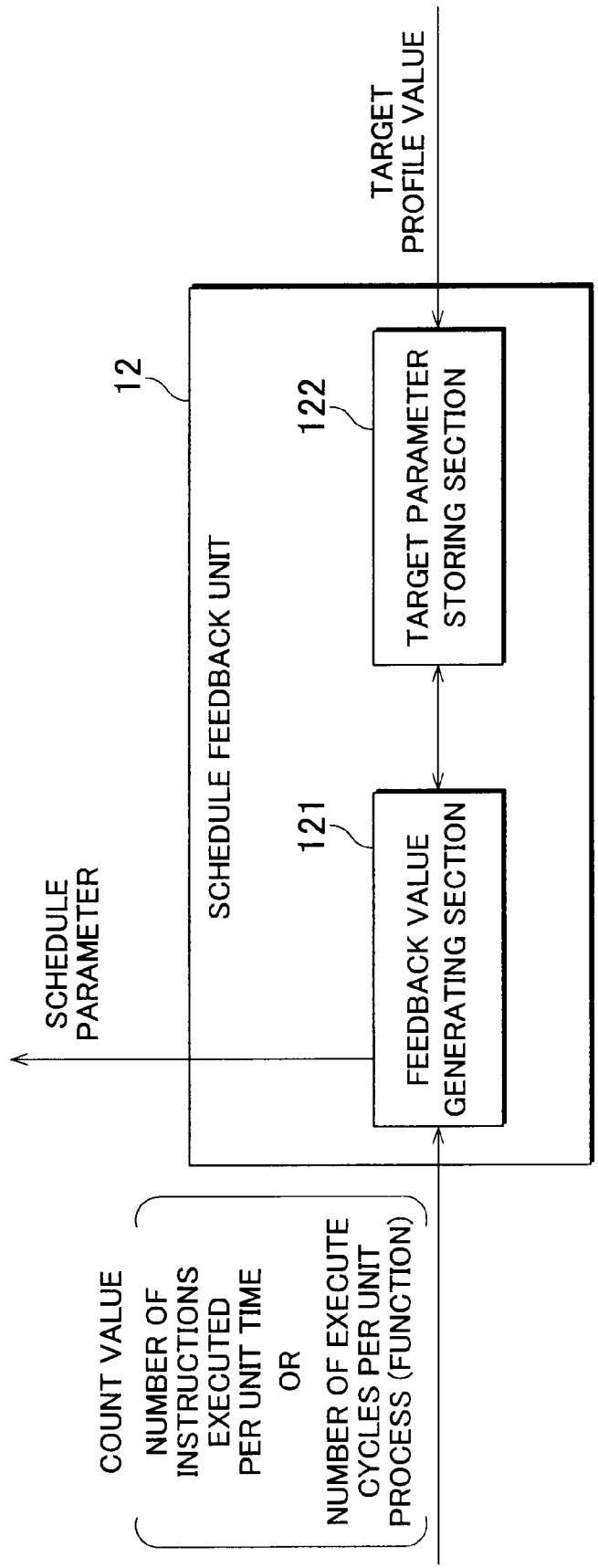
FIG. 5 is a schematic diagram of a schedule feedback unit that is illustrated in FIG. 3A.

FIG. 5 shows schematic configuration of the schedule feedback unit 12. The schedule feedback unit 12 includes a feedback value generating section 121 and a target parameter storing section 122.

FIG. 6A to 6C are views that schematically illustrate the target profiles. FIG. 6A shows the IPC (a processing load in a broad sense) of each emulated CPU. FIG. 6A shows that the IPCs fluctuate with time and that a mode of fluctuation differs between each of the emulated CPUs #0 to #2. When the programs #0 to #2 are ported, the programs #0 to #2, which are executed by the emulated CPUs #0 to #2, are respectively executed by the vCPUs #0 to #2, which have high processing power, in emulated CPUs #0 to #2.

The IPCs increase when the programs #0 to #2 are executed by using the maximum processing power of the vCPUs #0 to #2. Thus, as shown in the dotted lines in FIG. 6B, the executions of the programs #0 to #2 tend to be advanced. However, this does not ensure the appropriate execution timings of the programs #0 to #2. Accordingly, as shown in the solid lines in FIG. 6B, the IPCs are converted in accordance with the processing power of the vCPUs #0 to #2 so that the IPCs of the emulated CPUs #0 to #2 are respectively reproduced in the vCPUs #0 to #2. The IPCs after the conversion decrease altogether. However, fluctuation behavior of the IPCs remains the same as those of the emulated CPUs #0 to #2. The instructions issued in the vCPUs #0 to #2 are scheduled to correspond with the IPCs after the conversion. Accordingly, it is possible to respectively correspond the number of instructions executed per unit time or the number of execute cycles per unit process of the emulated CPUs to the number of instructions executed per unit time or the number of execute cycles per unit process of the vCPUs #0 to #2. The IPCs after the conversion set as the target profiles.

FIG. 6C shows the total IPC of the processor 50. The total IPC of the processor 50 is in a form in which the IPCs in FIG. 6B are cumulated per time. The multithread execution device may dynamically control the instruction issue rate to obtain the IPC that fluctuates intricately as described above.

Figure 7A:
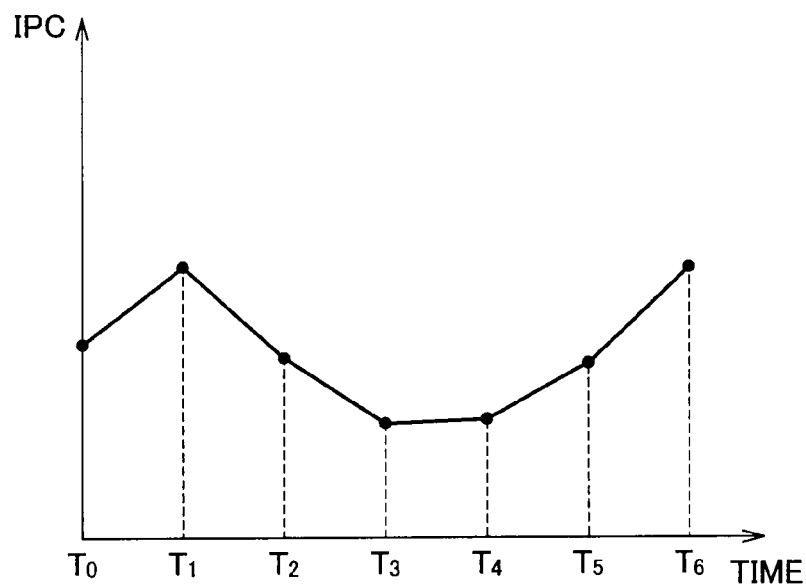
FIGS. 7A and 7B are views that respectively illustrate the target profile (IPC) and the target profile (number of execute cycles per unit process)
Figure 7B:
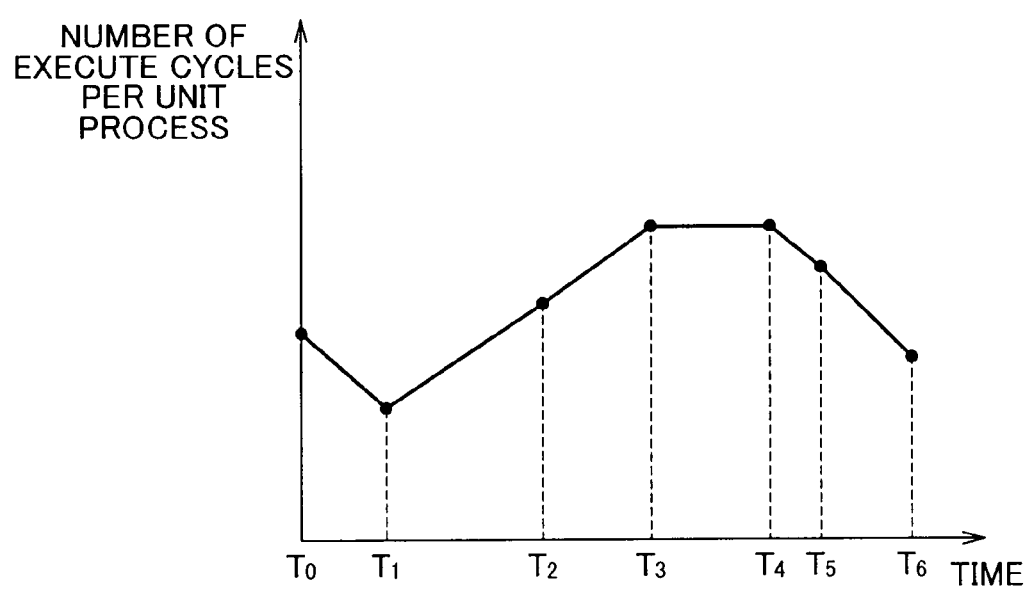

Referring again to FIG. 5, the target parameter storing section 122 stores a target profile value. The target profile will be described next. FIG. 7A and FIG. 7B each shows an example of the target profile. As described above, the target profile is either the application execution profile or the standard profile.

The application execution profile will be described first. The application execution profile is either the number of instructions executed per unit time or the number of execute cycles per unit process. In order to obtain either the number of instructions executed per unit time or the number of execute cycles per unit executed process, the same method as that used by the execution status monitor 14 may be used.

FIG. 7A shows the IPC that is computed from the number of instructions executed per unit time. The IPC is computed from "the number of instructions executed/unit time (time per clock cycle)". The IPC is plotted at each time Tn. Because the number of instructions executed is counted for each unit time, the IPC is plotted at equal intervals.

FIG. 7B shows the number of execute cycles per unit process. The number of execute cycles differs from one unit process to another. Thus, the number of execute cycles per unit process is not necessarily plotted at equal intervals.

As described above, when the ISAs of the emulated CPUs are the same as the ISAs of the vCPUs #0 to #2, the IPC in FIG. 7A is selected as the target profile. However, if the ISAs of the emulated CPUs differ from the ISAs of the vCPUs #0 to #2, the number of execute cycles per unit process in FIG. 7B is selected as the target profile. Because the CPUs to be emulated and the ISA of the processor 50 to which the programs are ported are known, the application execution profile memory 60 needs to store only one of the target profiles in FIGS. 7A and 7B.

When the emulated CPU executes the program on an operating system (OS), the application execution profile is computed with the OS code included. Alternatively, the standard profile may be used in an interval where the program is executed on the OS.

While the application execution profile is an actual measured value if one of the emulated CPUs executes one of the programs #0 to #2, the standard profile is an artificially- or mechanically-set target profile. For example, when it is difficult to count the number of instructions executed per unit time or the number of execute cycles per unit process in the emulated CPU, the schedule feedback unit 12 uses the standard profile.

If the standard profile is set in the easiest manner, a designer, for example, registers a fixed IPC or the number of execute cycles per unit process in the standard profile memory 70. During the development stage of the program that is executed in the emulated CPU, the designer usually knows the approximate IPC or the number of execute cycles per unit process of the emulated CPU. Thus, the designer may set the IPC or the number of execute cycles per unit process for each of the emulated CPUs. For example, it is set in a program for engine control that IPC=0.2 and the number of execute cycles per unit process=100.

Alternatively, the standard profile can be obtained mechanically. Usually, the number of clock cycles required for each type of computation in an emulated CPU is statistically known. The types of computation include addition, multiplication, division, and the like. The minimum number of clock cycles required for each computation is almost fixed. Meanwhile, a branching instruction or I/O pending increases the number of clock cycles that is required for computation. However, it is possible to statistically compute an increase in clock cycles until the completion of the computation that is caused by the branching instruction or the I/O pending. Thus, each instruction of the object code executed by the emulated CPU is weighted by the fixed number of clock cycles, and the branching instruction or an instruction that generates the I/O pending is weighted statistically. Consequently, an assumption can statistically be made on the clock cycles of each instruction upon execution of the program by the CPU.

In addition, if the required number of clock cycles is computed at intervals of the specified number of instructions so as to obtain the average number of clock cycles per the specified number of instructions, the number of clock cycles that is required to execute one instruction may be determined. For example, if 50 operation clocks are required to execute 10 instructions, "50/10=5 clock cycles" are required to execute one instruction. An inverse number of the above (i.e., 0.2) is the IPC. The time spent by one operation clock may be computed from the operating frequency of the emulated CPU. For example, if the operating frequency of the emulated CPU is 200 MHz, the time spent by one operation clock is 1/(2× 108) [s]. Thus, as in FIG. 7A, it is possible to set the target profile in which the time and the IPC are corresponded to each other.

In addition, if the specified codes that indicate the beginning and the end of the function are detected in the object code, and the numbers of clock cycles between the specified codes are cumulated, the number of execute cycles per unit process may be computed. If the time spent by one operation clock is multiplied by the number of execute cycles per unit process, the execution time for each unit process is derived. Thus, as in FIG. 7B, it is possible to set a target profile in which the time and the number of execute cycles per unit process are corresponded to each other.

If the ISAs of the vCPUs to be emulated are the same as the ISAs of the vCPUs #0 to #2, the feedback value generating section 121 is provided with the number of instructions executed per unit time from the execution status monitor 14. However, if the ISAs of the emulated CPUs differ from the ISAs of the vCPUs #0 to #2, the feedback value generating section 121 is provided with the number of execute cycles per unit process from the execution status monitor 14.

First, a case where the number of instructions executed per unit time is provided will be described. FIG. 8A shows the procedure for calculating the target IPC. As shown below, the target IPC is computed using the following Equation 1.

Target IPC=IPC of the emulated CPU (target profile value)/ratio between the operating frequency of the emulated CPU and the operating frequency of the vCPU    (Equation 1)

The IPC of the emulated CPU is retrieved from the target profile in FIG. 7A. In general, newer processors 50 (with a finer manufacturing process) have a higher operating frequency. Thus, the ratio between the operating frequency of the emulated CPU and the operating frequency of one of the vCPUs #0 to #2 is likely to be one or more. From what has been described so far, for example, if the IPC of the emulated CPU is "0.8", and the ratio between the operating frequency of the emulated CPU and the operating frequency of one of the vCPUs #0 to #2 is "2", the target IPC is "0.4". The feedback value generating section 121 computes the equation 1 each time the time Tn has elapsed. The scheduling parameter is then transmitted to the thread scheduler 11 during each clock cycle.

FIG. 9A is a view that shows the schedule parameter that is generated from the target IPC and the number of instructions executed per unit time. In order to generate the schedule parameter, the feedback value generating section 121 first converts the execution number of instruction per unit time (actual measured value) to an actual measured IPC. The actual measured IPC is computed from "the number of instructions executed/unit time (time per clock cycle)".

The feedback value generating section 121 compares the target IPC with the actual measured IPC to determine the schedule parameter. For example, when the target IPC is "0.4" and the actual measured IPC is "0.27", the feedback value generating section 121 computes "0.4−0.27=0.13" and determines the schedule parameter based on the difference. The feedback value generating section 121 categorizes the differences between the target IPC and the measured IPC into 5 stages, for example, to determine the schedule parameter. The larger difference results in a larger schedule parameter. If the difference is a negative value, the schedule parameter is also a negative value. If the schedule parameter is generated in the manner described above the schedule parameter is an integer "from −5 to +5".

In FIG. 9A, each time the target profile value retrieved from the application execution profile memory 80 or the standard profile memory 70 is switched, the target IPC is computed. The schedule feedback unit 12 feeds back the schedule parameter to the thread scheduler 11 each clock cycle. As a result, the actual measured IPC gradually approximates the target IPC.

Next, a case where the schedule feedback unit 12 is provided with the number of execute cycles per unit process will be described. FIG. 8B shows a computational procedure of the target number of execute cycles. As shown in FIG. 8B, the target number of execute cycles is computed from the following Equation 2.

Target number of execute cycles=number of execute cycles per unit process of the emulated CPU (target profile value)×ratio between the operating frequency of the emulated CPU and the operating frequency of vCPU    (Equation 2)

The number of execute cycles per unit process of the emulated CPU is retrieved from the target profile in FIG. 7B. For example, if the number of execute cycles per unit process of the emulated CPU is "100", and the ratio between the operating frequency of the emulated CPU and the operating frequency of one of the vCPUs #0 to #2 is "2", the target number of execute cycles is "200". The feedback value generating section 121 computes the equation 2 every time the time Tn has elapsed. The schedule parameter is transmitted every operation clock.

FIG. 9B is a view that shows the schedule parameter that is generated from the target number of execute cycles and the number of execute cycles per unit process. The feedback value generating section 121 compares the target number of execute cycles with the number of execute cycles per unit process (actual measured value) to determine the schedule parameter. For example, when the target number of execute cycles is "200" and the number of execute cycles per unit process (actual measured value) is "150", the feedback value generating section 121 computes "200−150=50" and determines the schedule parameter based on the difference. The feedback value generating section 121 may categorize the differences between the target number of execute cycles and the number of execute cycles per unit process (actual measured value) into, for example, 5 stages to determine the schedule parameter. If the difference is a negative value, the schedule parameter is also a negative value. Because the number of execute cycles is large, the ratio between the target IPC and the number of instructions executed per unit time may be used instead of the difference between the target IPC and the number of instructions executed per unit time to generate the schedule parameter.

Thread scheduling will now be described. Although there is a case where a granular task within a thread is scheduled, the scheduling of the threads #0 to #2 will be described in this embodiment. The thread scheduling is about which of the instruction buffers #0 to #2 is connected to the instruction decoder 18 (to determine where the selector switch 19 switches).

The thread scheduling contains following determinants. The higher determinant takes precedence:
(P1) Hardware interrupt;
(P2) schedule parameter; and
(P3) Internal factor of the thread.

The hardware interrupt is a situation in which the instruction is preferentially supplied to the thread when an abnormality is detected in a sensor related to the thread, a power source, or the like, or when a user operation is input. The internal factor of thread is a situation in which supply of the instruction to the thread is terminated and resumed due to occurrence and resolution of the I/O pending, a processing queue for another thread, a hazard, or the like.

The thread scheduler 11 schedules the thread on the basis of the "schedule parameter" instead of the above two determinants. Because the hardware interrupt in the highest of the priority is considered to hardly occur, the thread scheduler 11 gives preference to the schedule parameter over the internal factor of the thread and schedules the thread based on the schedule parameter.

Figure 10:
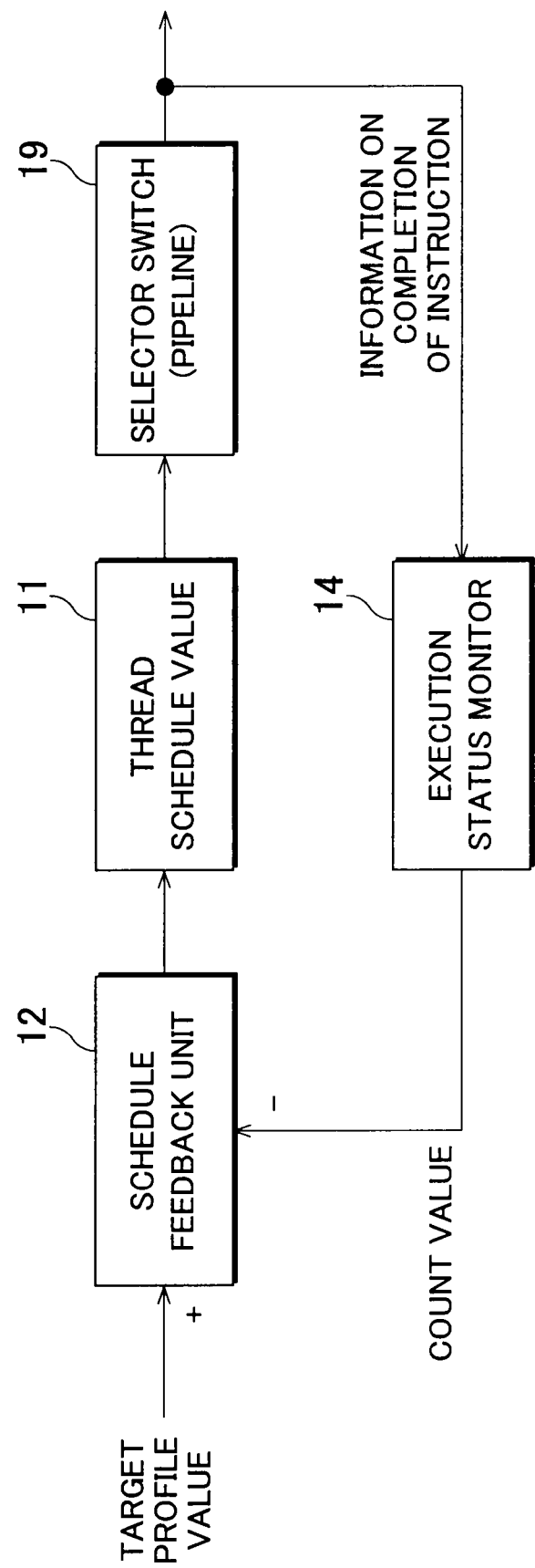
FIG. 10 is a view that schematically shows a thread scheduling control system.

FIG. 10 is a schematic view of a thread scheduling control system. As it has been described so far, the target profile value and the count value are input to the thread feedback unit 12. The schedule feedback unit 12 outputs the schedule parameter that is generated from the target profile value and the count value to the thread scheduler 11 each clock cycle. The thread scheduler 11 controls the selector switch 19 for each thread in accordance with the schedule parameter, and switches the connection of the instruction decoder 18 to the appropriate instruction buffer. Alternatively, the thread scheduler 11 does not connect the instruction decoder 18 any of the instruction buffers #0 to #2.

Because the count value is not counted immediately after the activation of the processor 50, the thread scheduler 11 schedules the thread based on a default value of the schedule parameter. The default value of the schedule parameter is "0", for example. In this case, the thread scheduler 11 equalizes the instruction issue rates of the threads #0 to #2.

A reference time in a time line of each of the vCPUs #0 to #2 needs to correspond to a reference time in a time line of the target profile. Thus, the thread scheduler 11 relates the specified reference time to the time Tn of the target profile. For example, the thread scheduler 11 relates a time when a reset signal is input to the processor 50 to the time T0 of the target profile, or relates a time when one of the vCPUs #0 to #2 fetches the initial instruction of corresponding one of the programs #0 to #2 to the time T0 of the target profile.

Figure 11A:
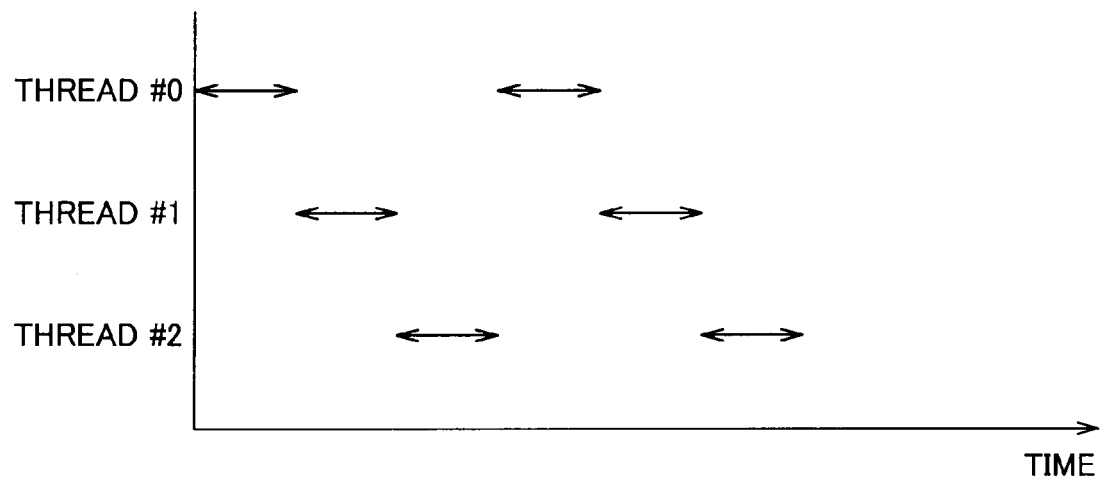
FIGS. 11A and 11B are views that illustrate an execution status of each thread.

FIG. 11A shows an execution status of each thread. FIG. 11A is a view for a purpose of comparison and shows a case where the feedback is not performed by the schedule parameter. The thread scheduler 11 connects each thread (issues an instruction) to the instruction decoder 18 at a specified rate. In FIG. 11A, each thread is divided equally with respect to time and executed. Then, the thread is appropriately switched in accordance with the internal factor of the thread. A time assigned to each thread by time division is approximately 1 to 100 clock cycles.

If the thread scheduler 11 schedules one of the threads #0 to #2, it is considered that the schedule parameter of another of the threads #0 to #2 should be put into consideration. This is because the processor 50 does not necessarily have the sufficient processing capacity, and thus, an increase in the assigned time for one thread may reduce the assigned time for another thread. In view of the above, the multithread execution device 100 defines the priority for each thread in advance, and controls the assigned time of each thread in the order of priority.

Figure 11B:
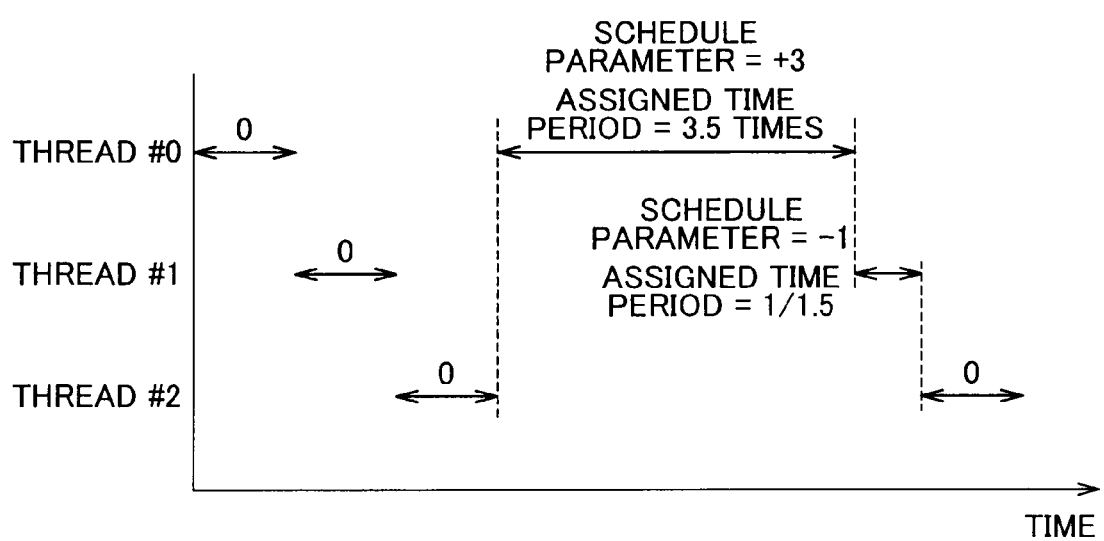

FIG. 11B shows the assigned times of the threads #0 to #2 when the threads #0 to #2 are scheduled by the schedule parameter. If the schedule parameter of the thread with the highest priority is not "0", the thread scheduler 11 sets the assigned time of the thread in the highest priority. The thread scheduler 11 may calculate the assigned time in the following manner. If the schedule parameter is a positive value: the assigned time is multiplied by "α+the schedule parameter". If the schedule parameter is a negative value: the assigned time is multiplied by "1/(α+an absolute value of the schedule parameter)". The symbol α is a parameter that is weighted on the schedule parameter, and is "α=0.5 (0<α<1)", for example.

For example, if the schedule parameter of the thread #0 is "+3", the thread scheduler 11 multiplies the assigned time by "0.5+3". Accordingly, it is possible to preferentially approximate the execution timing of the thread #0 with the highest priority to the execution timing of the emulated CPU. It should be noted that the assigned time is set with specified upper and lower limits.

If the schedule parameter of the thread #0 with the highest priority becomes "0", the thread scheduler 11 then sets the assigned time of the thread #1 with the second highest priority. For example, if the schedule parameter of the thread #1 is "−1", the thread scheduler 11 multiplies the assigned time by "1/(0.5+1)". Accordingly, the assigned time of the each thread may be adjusted in accordance with the schedule parameter.

Alternatively, the thread scheduler 11 may control the assigned times of the threads #0 to #2 regardless of the priority order. For example, the thread scheduler 11 controls the assigned times of the threads #0 to #2 in series. In this case, the thread scheduler 11 may control the assigned time of the thread with the highest absolute value of the schedule parameter, or may control the assigned times of the threads in numerical order. The thread scheduler 11, for example, controls the assigned time as shown below.

(i) Control the assigned time of the thread with the highest absolute value of the schedule parameter.
(ii) Control the assigned time of the thread with the second highest absolute value of the schedule parameter.
(iii) Repeat the above two steps until all the schedule parameter s approximate zero.

As described above, it is possible to preferentially approximate the execution timing of the thread, which has the greatest gap between the execution timing of the thread and the execution timing of the emulated CPU, to the execution timing of the emulated CPU by controlling the assigned times of threads in the descending order of the absolute value of the schedule parameter. It is also possible to gradually approximate the execution timings of all the threads to the execution timings of the emulated CPUs.

Figure 12A:
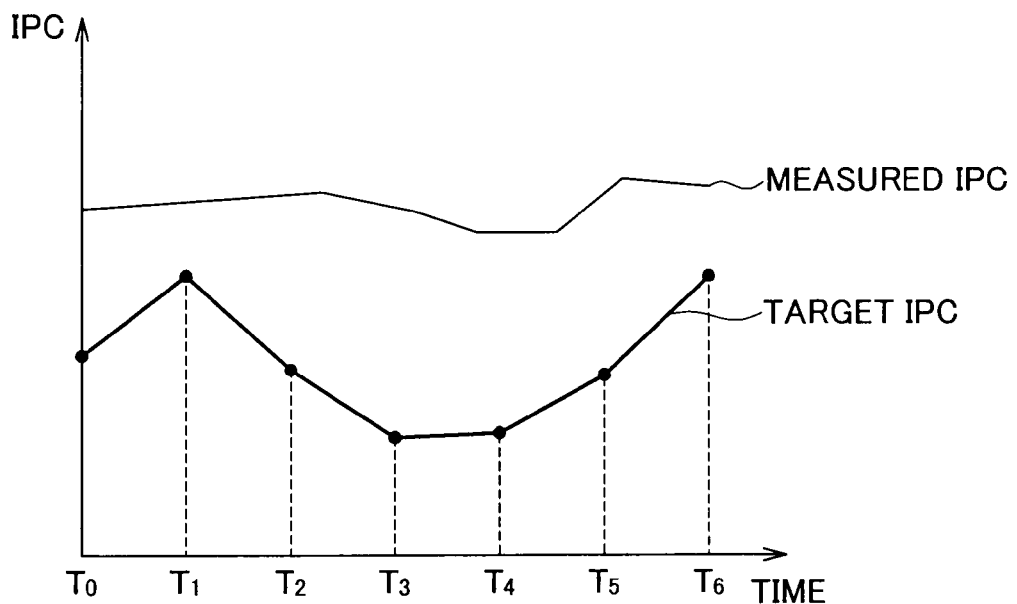
FIGS. 12A and 12B are views that illustrate an effect of a multithread execution device.
Figure 12B:
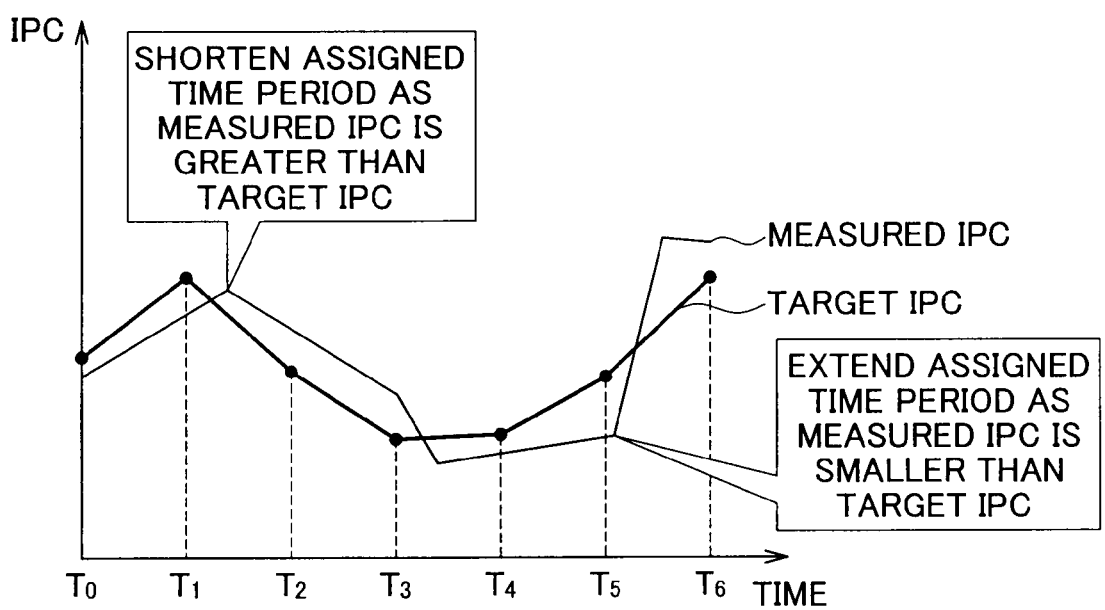

FIGS. 12A and 12B show the effect of the multithread execution device 100. FIG. 12A shows a relationship between the actual measured IPC and the target IPC with respect to time. As shown in FIG. 12A, the target IPC is lower than the actual measured IPC.

It is possible to bring the actual measured IPC to the target IPC by implementing the thread scheduling of this embodiment. As shown in FIG. 12B, it is possible to reduce the difference between the target IPC and the actual measured IPC by adjusting the assigned time of each of the threads #0 to #2.

Figure 13:
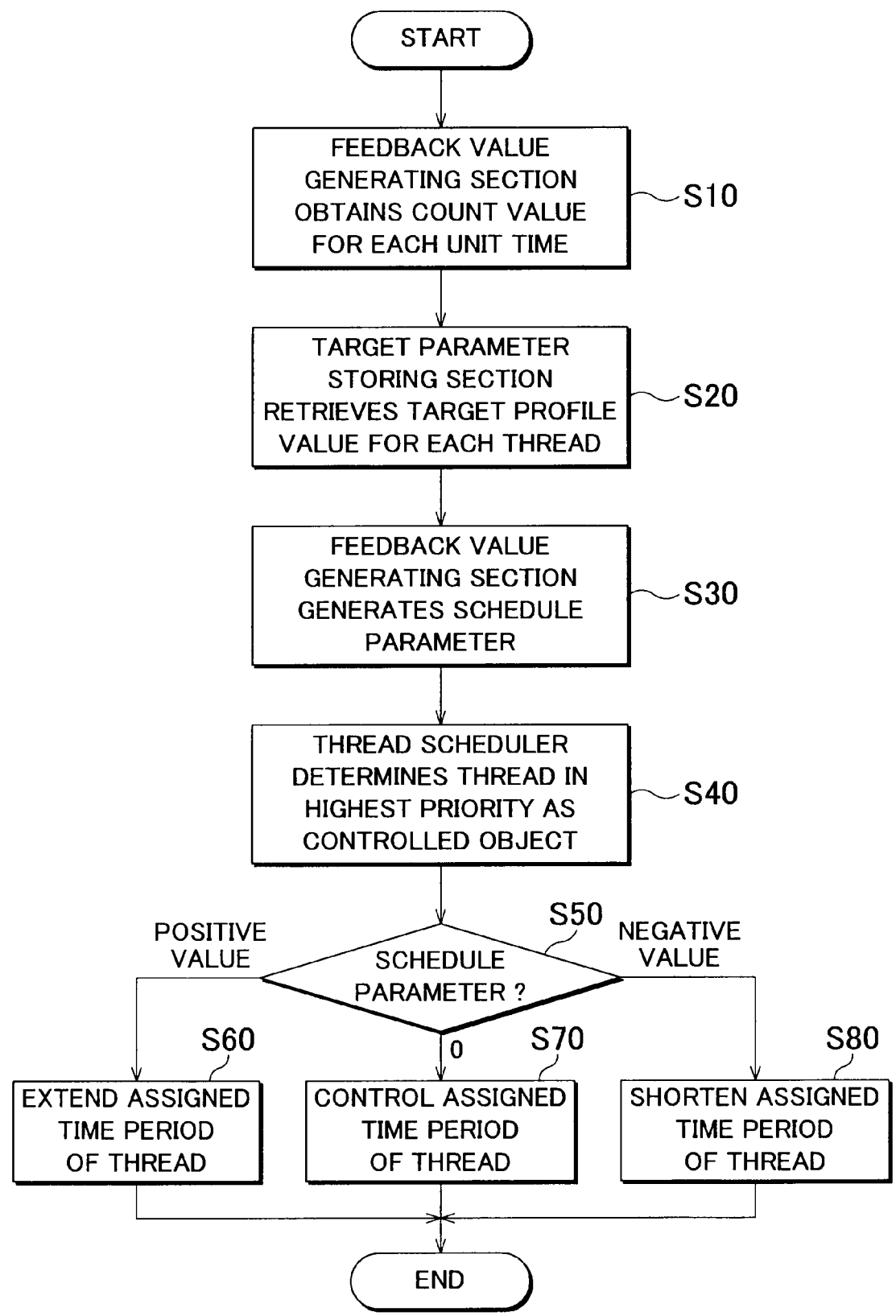
FIG. 13 is a flowchart that shows the steps in which the multithread execution device controls an assigned time of the thread.

FIG. 13 is a flowchart of procedures in which the multithread execution device 100 dynamically optimizes the instruction issue rate. The flowchart in FIG. 13 starts when multithread execution device 100 is activated. Immediately after the activation of the multithread execution device 100, the thread scheduler 11 connects one of the instruction buffers #0 to #2 to the instruction decoder 18 based on the initial value of the instruction issue rate. During the connection, the execution status monitor 14 counts the count value.

The execution status monitoring section 141 starts counting the count value when the reset signal is detected. The time when this reset signal is detected corresponds to the time T0 of the target profile, for example. The feedback value generating section 121 obtains the count value from the counter section 142 for each unit time (S10).

The target parameter storing section 122 retrieves the target profile value from the application execution profile memory 60 or the standard profile memory 70 for each of the threads #0 to #2 (S20).

Then, the feedback value generating section 121 compares the target profile value of the thread at the time Tn with the count value that is provided per unit time for each of the threads #0 to #2, and generates the schedule parameter (S30). The schedule parameter is transmitted to the thread scheduler 11.

The thread scheduler 11 determines the thread with the highest priority as its control object (S40). Then, the thread scheduler 11 determines whether a schedule parameter of the selected thread of the threads #0 to #2 is a positive value, a negative value, or "0" (S50). When the schedule parameter is a positive value, the thread scheduler 11 extends the assigned time of selected one of the threads #0 to #2 (S60). When the schedule parameter is "0", the thread scheduler does not control the assigned time of the selected thread of threads #0 to #2 (S70). When the schedule parameter is a negative value, the thread scheduler 11 shortens the assigned time of the selected thread of the threads #0 to #2 (S80).

Next, the thread scheduler 11 determines whether the schedule parameter of another of the threads #0 to #2 is not "0". If the schedule parameter of another one of the threads #0 to #2 is not "0", the thread scheduler 11 repeats the processes from step S40.

As it has been described so far, because the multithread execution device 100 of this embodiment can dynamically optimize the number of instructions executed per thread, it is possible to replicate the execution timings of the programs #0 to #2 in the emulated CPU on the integrated CPU. Therefore, when the plurality of ECUs are integrated into a single ECU, it is possible to replicate the operation of each ECU before integration in the integrated ECU. Even if the program is ported to another CPU, the CPU to which the program is ported behaves the same as the original CPU in terms of time. Thus, the program need not be redesigned, and distribution of the program will be increased. Particularly, the CPU can be integrated into a different computer by using the number of execute cycles per unit process for the feedback control.

Figure 14:
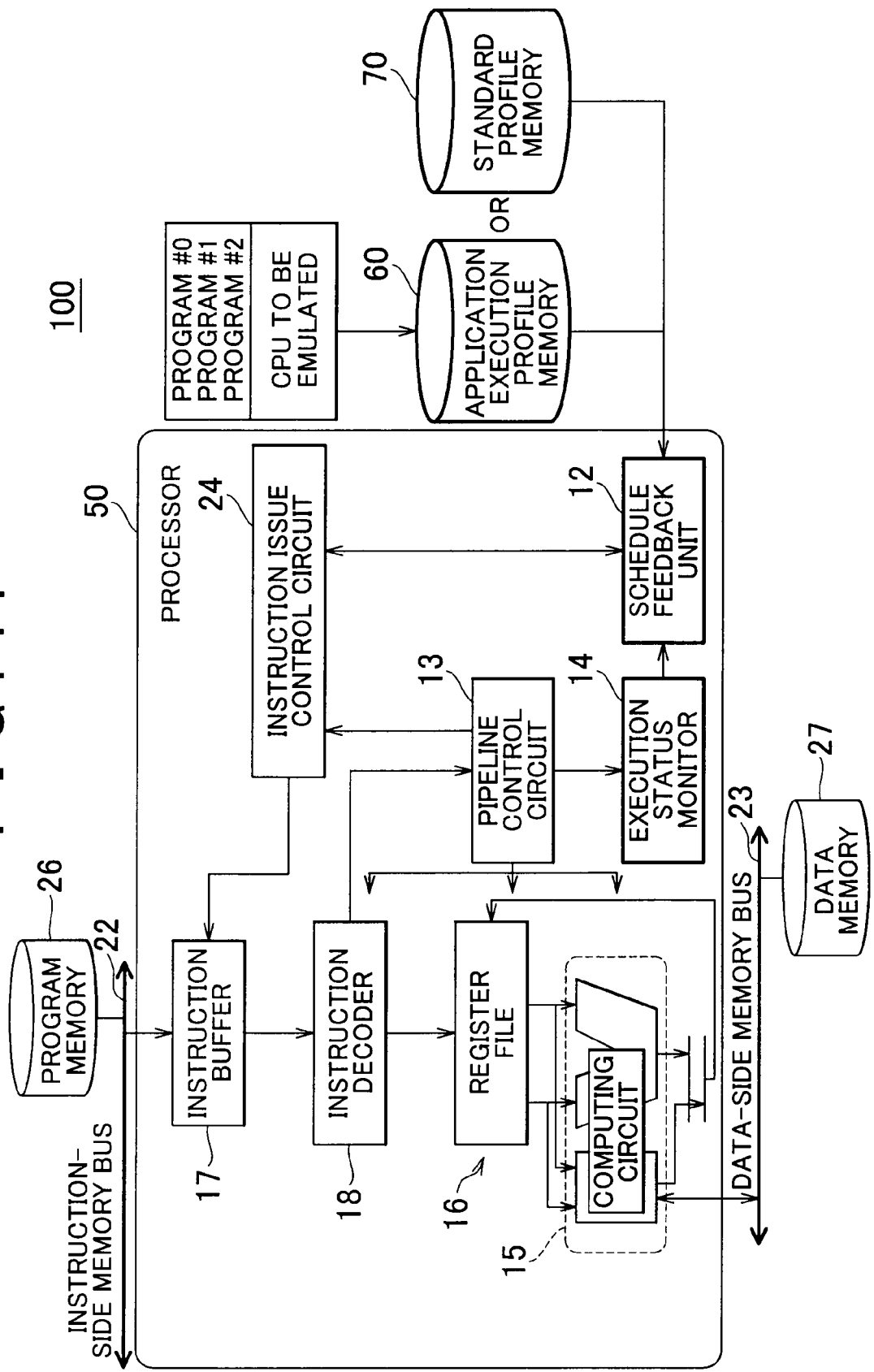
FIG. 14 is a schematic diagram of a multithread execution device according to a second embodiment of the present invention.

The description has been made so far with the assumption that the multithread execution device 100 according to the first embodiment has the plurality of threads. However, the multithread execution device 100 may also be used with only one thread. FIG. 14 is a schematic diagram of the multithread execution device 100 according to the second embodiment. In FIG. 14, the same components as those in FIG. 3 are designated by the same reference numerals, and their description is not repeated. If there is only one thread #0, there are also one instruction buffer and one register file 16. In addition, because a thread schedule is unnecessary, an instruction issue control circuit 24, instead of the thread scheduler 11, may be connected to the instruction buffer 17. The instruction issue control circuit 24 controls the timing for fetching the instruction from the instruction buffer 17 in accordance with the schedule parameter. More specifically, if the schedule parameter is a negative value, the instruction issue control circuit 24 generates a stall or inserts the NOP in the pipeline in accordance with the absolute value of the schedule parameter, for example. Accordingly, it is possible to reduce the number of instructions executed per unit time, to increase the number of execute cycles per unit process, and to replicate the execution timing of the emulated CPU. Alternatively, if the schedule parameter is a positive value, the instruction issue control circuit 24 increases a stall rate or a fetch rate of the NOP in accordance with magnitude of the schedule parameter. Accordingly, it is possible to increase the number of instructions executed per unit time, to decrease the number of execute cycles per unit process, and to replicate the execution timing of the emulated CPU.

In the first embodiment, the thread scheduler 11 compares the count value with the target profile value for each of the threads #0 to #2 to generate the schedule parameter for each of the threads #0 to #2. However, the thread scheduler 11 may generate the schedule parameter based on an instruction execution rate between the threads.

Figure 15:
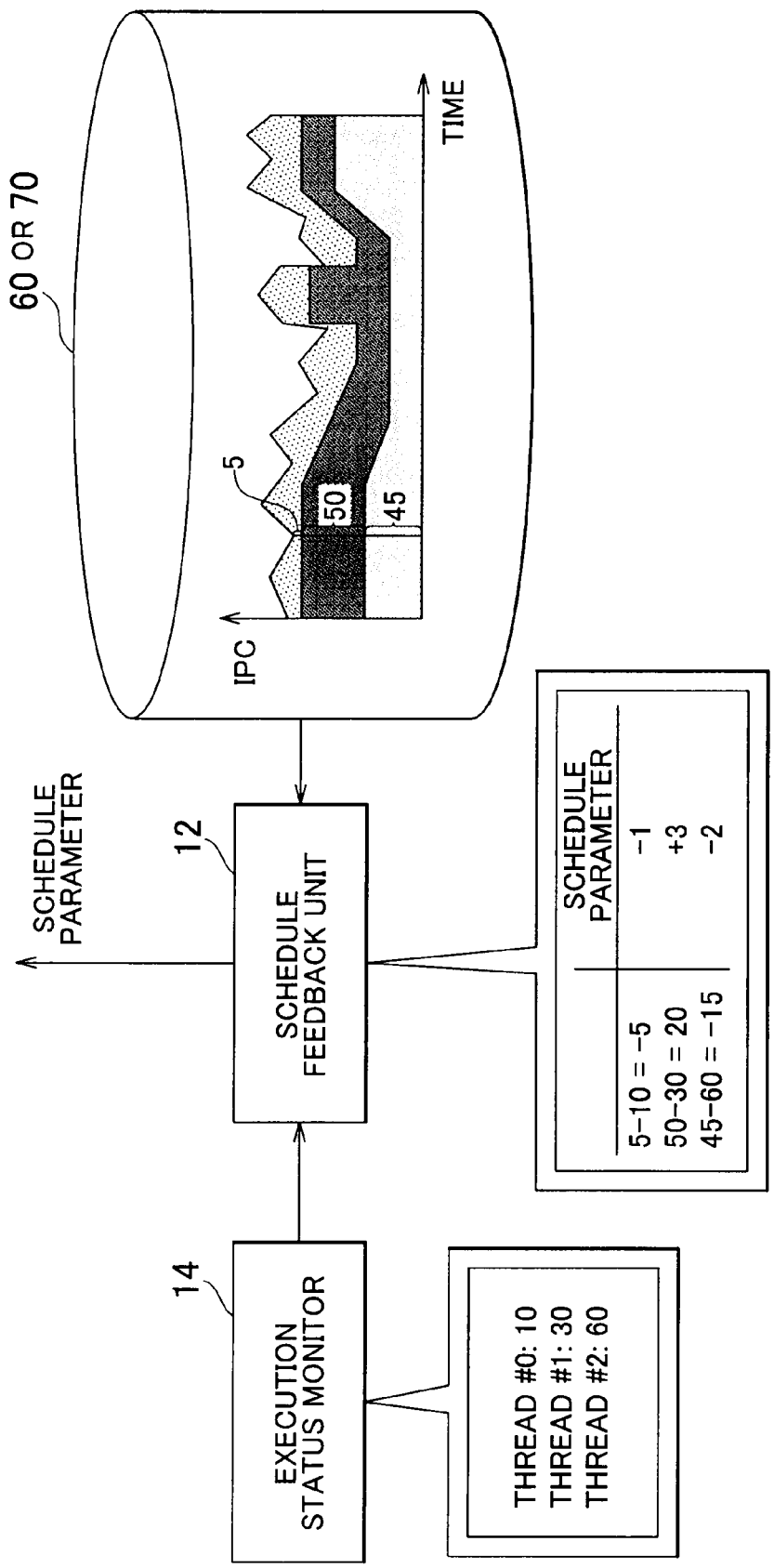
FIG. 15 shows a schedule parameter that is based on an instruction issue rate.

FIG. 15 is a view that shows the schedule parameter that is generated based on the instruction issue rate. Because the target profile for each of the emulated CPUs has been obtained, the IPC of the target profile or the number of execute cycles per unit process at the time Tn is known (FIG. 6C). Therefore, the execution rate of the programs #0 to #2 at the time Tn in the target profile may be derived. In FIG. 15, the target execution rate is "5:50:45". These numbers total 100 [%].

Because the execution status monitor 14 counts the count value for each of the threads #0 to #2, the execution rate of the threads #0 to #2 that is measured per unit time may be determined. In FIG. 15, the execution rate is "10:30:60".

If the execution rate of each of the threads #0 to #2 is compared with the target execution rate, the thread #0 is "5−10=−5", the thread #1 is "50−30=20", and the thread #2 is "45−60=−15". If the difference is a negative value, the execution rate of the thread is reduced. However, if the difference is a positive value, the execution rate of the thread is increased. Thus, the schedule feedback unit 12 generates the schedule parameter for each of the threads #0 to #2 in accordance with the comparison result.

If the assigned time of thread #1 is extended, the assigned time of the thread #0 or #2 is consequently shortened. Thus, the schedule parameter, which is generated based on the instruction execution rate among the threads, may schedule each of the threads while keeping consistency in the execution rates of all the threads.

The thread scheduler 11 schedules each thread by the feedback control. However, the thread scheduler 11 may instead schedule each thread by feed forward control. FIG. 16 is a schematic view of a thread scheduling control system. The thread scheduler 11 is connected with a feed forward unit 25. The feed forward unit 25 detects a disturbance, and transmits a detection result to the thread scheduler 11. The thread scheduler 11 controls the assigned time of each thread based on the disturbance to the schedule parameter that is obtained from the schedule feedback unit 12. The disturbance is an event that affects the hardware interrupt, the hazard, and the like, and is registered in advance. The pipeline control circuit 13 detects this event and notifies the thread scheduler 11 of the event. The thread scheduler 11 corrects the schedule parameter of the thread from among the threads #0 to #2 that generates the event in accordance with a type of the event. In consideration of the disturbance described above, it is possible to improve following capabilities of the programs #0 to #2 that are respectively executed by vCPUs #0 to #2 to the target profiles.

What is claimed is:

1. A multithread execution device comprising:
a program memory in which a plurality of programs are stored;
an instruction issue unit that issues an instruction of the program retrieved from the program memory;
an instruction execution unit that executes the instruction;
a target execution speed memory that stores target execution speed of the instruction;
an execution speed monitor that monitors an execution speed of the instruction; and
a feedback control unit that commands the instruction issue unit to issue the instruction so that the execution speed approximately equal to the target execution speed,
wherein the target execution speed is calculated based upon a ratio between an operating frequency of an emulated CPU and an operating frequency of a CPU in the multithread execution device.

2. The multithread execution device according to claim 1, wherein:
the target execution speed includes a target execution number of instructions executed per unit time;
the target execution speed monitor monitors the number of instructions executed per unit time; and
the feedback control unit commands the instruction issue unit to issue the instruction so that difference between the target execution number and the execution number is reduced.

3. The multithread execution device according to claim 2, wherein the target execution number is one of a number of instructions executed per unit time when the emulated CPU executes the program, and the number of instructions executed per unit time that is statistically obtained from a specification of the emulated CPU and the instruction contained in the program.

4. The multithread execution device according to claim 1, wherein:
the target execution speed includes a target number of execute cycles per unit process of the program;
the target execution speed monitor monitors the number of execute cycles per unit process of the program; and
the feedback control unit commands the instruction issue unit to issue the instruction so that a difference between the target number of execute cycles and the number of execute cycles is reduced.

5. The multithread execution device according to claim 4, wherein the target number of execute cycles is one of the number of execute cycles per unit process when an emulated CPU executes the program, and the number of execute cycles per unit process that is statistically obtained from a specification of the emulated CPU and the instruction contained in the program.

6. The multithread execution device according to claim 3, wherein the target number of execute cycles is corrected based on a ratio between an operating frequency of the emulated CPU and an operating frequency of a CPU in the multithread execution device.

7. The multithread execution device according to claim 1, wherein the target execution speed corresponds to an execution time period of the program that is started to be measured at a specified reference time.

8. The multithread execution device according to claim 1, wherein the instruction issue unit determines the program based on a specified order of priority for each of the plurality of programs so that the execution speed approximately equal to the target execution speed.

9. The multithread execution device according to claim 1, wherein the instruction issue unit sets the execution speed so that it approximates the target execution speed for each of the plurality of programs in a decreasing order of deviation in the program between the execution speed and the target execution speed.

10. The multithread execution device according to claim 1, wherein the feedback control unit commands the instruction issue unit to issue the instruction such that an execution rate between threads that is computed from the execution speed approximately corresponds to a target execution rate between threads that is computed from the target execution speed for each of the plurality of programs.

11. A method for executing multiple threads comprising:
retrieving an instruction from a program memory that stores a plurality of programs;
issuing the retrieved instruction of the program through an instruction issue unit;
executing the instruction;
monitoring an execution speed of the instruction; and
commanding the instruction issue unit to issue the instruction such that the execution speed approximately equal to target execution speed retrieved from a target execution speed memory in which the target execution speed of the instruction is stored,
wherein the target execution speed is calculated based upon a ratio between an operating frequency of an emulated CPU and an operating frequency of a CPU executing the instruction.

* * * * *